(12) United States Patent
Chiou

(10) Patent No.: US 9,505,981 B2
(45) Date of Patent: Nov. 29, 2016

(54) LIQUID CRYSTAL ALIGNMENT AGENT, LIQUID CRYSTAL ALIGNMENT FILM, AND LIQUID CRYSTAL DISPLAY DEVICE

(71) Applicant: Chi Mei Corporation, Tainan (TW)

(72) Inventor: Shin-Rong Chiou, Kaohsiung (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 14/660,898

(22) Filed: Mar. 17, 2015

(65) Prior Publication Data

US 2015/0275092 A1    Oct. 1, 2015

(30) Foreign Application Priority Data

Mar. 25, 2014    (TW) ............... 103111085 A

(51) Int. Cl.
| | | |
|---|---|---|
| *C08G 73/10* | (2006.01) | |
| *G02F 1/1337* | (2006.01) | |
| *C09K 19/56* | (2006.01) | |
| *C08J 5/18* | (2006.01) | |
| *C08L 79/08* | (2006.01) | |
| *C09D 179/08* | (2006.01) | |

(52) U.S. Cl.
CPC ........... *C09K 19/56* (2013.01); *C08G 73/1042* (2013.01); *C08G 73/1075* (2013.01); *C08G 73/1078* (2013.01); *C08J 5/18* (2013.01); *C08L 79/08* (2013.01); *C09D 179/08* (2013.01); *G02F 1/133711* (2013.01); *G02F 1/133723* (2013.01); *G02F 1/133788* (2013.01); *C08J 2379/08* (2013.01); *Y02P 20/582* (2015.11)

(58) Field of Classification Search
None
See application file for complete search history.

(56) References Cited

U.S. PATENT DOCUMENTS 5,276,132 A    1/1994  Nishikawa et al.

FOREIGN PATENT DOCUMENTS

| CN | 101921597 | 12/2010 |
|---|---|---|
| CN | 102010719 | 4/2011 |
| CN | 102140352 | 8/2011 |
| CN | 102629030 | 8/2012 |
| CN | 103450479 | 12/2013 |
| CN | 103450911 | 12/2013 |
| EP | 0 503 918 | * 9/1992 |
| JP | S5691277 | 7/1981 |
| JP | H01-120528 | 5/1989 |
| JP | H11-258605 | 9/1999 |
| JP | 2002-250924 | 9/2002 |
| JP | 2004-83810 | 3/2004 |
| JP | 2005-037654 | 2/2005 |
| JP | 2011-158835 | * 8/2011 |
| TW | 201001029 | 1/2010 |
| TW | 201137038 | 11/2011 |

OTHER PUBLICATIONS

Ziad Ali-Adib et al. Examples of amphitropic polymers: monolayer film, Langmuir-Blodgett film, and liquid-crystalline properties of some polymeric amphiphiles containing cholestanol moieties and those of some closely related non-polymeric amphiphiles. J. Mater. Chem. 1996, 6(1 ), 15-22.*
Machine Translation of JP 2011-158835, Nakada et al. Aug. 18, 2011 pp. 1-40.*
"Office Action of Taiwan Counterpart Application", issued on Jun. 10, 2015, p. 1-p. 4.
"Office Action of China Counterpart Application", issued on Aug. 17, 2016, p.1-p.6.

* cited by examiner

*Primary Examiner* — Susannah Chung
*Assistant Examiner* — Robert T Butcher
(74) *Attorney, Agent, or Firm* — Jianq Chyun IP Office

(57) ABSTRACT

A liquid crystal alignment agent, a liquid crystal alignment film, and a liquid crystal display device are provided. The liquid crystal alignment agent includes a polymer composition (A-1) and a solvent (B). The polymer composition (A-1) is obtained by reacting a tetracarboxylic acid dianhydride compound (a) with a diamine compound (b). The diamine compound (b) includes at least one type of diamine (b-1) represented by formula (I) and at least one type of diamine (b-2) having the structure represented by formula (II). The liquid crystal alignment agent can be made into a liquid crystal display device having good uniformity of pretilt angle after ultraviolet irradiation.

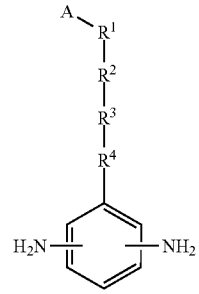

formula (I)

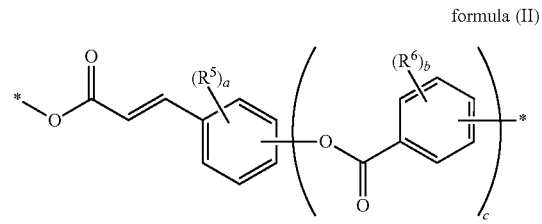

formula (II)

7 Claims, 1 Drawing Sheet

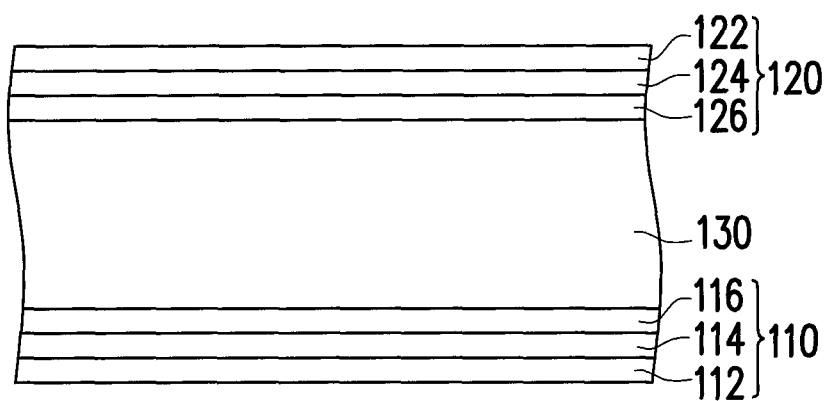

LIQUID CRYSTAL ALIGNMENT AGENT, LIQUID CRYSTAL ALIGNMENT FILM, AND LIQUID CRYSTAL DISPLAY DEVICE

CROSS-REFERENCE TO RELATED APPLICATION

This application claims the priority benefit of Taiwan application serial no. 103111085, filed on Mar. 25, 2014. The entirety of the above-mentioned patent application is hereby incorporated by reference herein and made a part of this specification.

BACKGROUND OF THE INVENTION

1. Field of the Invention

The invention relates to a liquid crystal alignment agent, a liquid crystal alignment film, and a liquid crystal display device. More particularly, the invention relates to a liquid crystal alignment agent that can be made into a liquid crystal display device having good uniformity of pretilt angle after ultraviolet irradiation, a liquid crystal alignment film formed thereby, and a liquid crystal display device having the liquid crystal alignment film.

2. Description of Related Art

So far, known liquid crystal display device include, for instance, various liquid crystal display devices of twisted nematic (TN)-type, super twisted nematic (STN)-type, vertical alignment (VA)-type, in plane switching (IPS)-type, fringe field switching (FFS)-type, or optically compensated bend (OCB)-type that use liquid crystal molecules having positive dielectric anisotropy. Moreover, to perform alignment control of each liquid crystal molecule, a liquid crystal alignment film (patent literatures 1-4) formed by an organic film is mainly used.

Due to the high-speed response of the liquid crystal molecules of, for instance, the TN-type or STN-type liquid crystal alignment film and the certainty of the inclination direction of, for instance, the VA-type liquid crystal alignment film when liquid crystals are driven, each of the TN-type or STN-type and the VA-type liquid crystal alignment film needs to have pretilt angle characteristics. A method of providing pretilt angle characteristics is, in the former cases, generally a rubbing method, and in the later case, is generally a rubbing method or, for instance, a method in which a protrusion is disposed on a substrate surface. In particular, dust or static electricity generated in the steps of the rubbing method sometimes causes the issue of poor display or a damaged circuit. Moreover, the method in which a protrusion is disposed on a substrate surface sometimes damages, for instance, the brightness of the obtained liquid crystal display device. The methods therefore all have drawbacks.

As a result, regarding a method of providing pretilt angle that is used to replace the methods above, a so-called photoalignment method (patent literature 5) in which ultraviolet is irradiated on a photosensitive thin film from a direction inclined relative to the normal of the film is provided. However, the liquid crystal display device made by the liquid crystal alignment agent recited in patent literature 5 still has the issue of poor uniformity of pretilt angle after ultraviolet irradiation, and is therefore not suitable for use.

Moreover, regarding a method in which liquid crystal alignment is provided to a coating film formed by a liquid crystal alignment agent containing, for instance, polyamic acid, in recent years, a technique using a photoalignment method such as photoisomerization, photodimerization, or photolysis has been proposed to replace the rubbing method. The photoalignment method is as follows: anisotropy is provided to a film by irradiating a radiation-sensitive organic thin film formed on a substrate with polarized or unpolarized radiation so as to control the alignment of liquid crystal molecules. According to the method, in comparison to the rubbing method above, the generation of dust or static electricity in the steps can be suppressed, and therefore the generation of poor display caused by, for instance, dust, or reduction of yield can be suppressed. Moreover, the photoalignment technique also has the advantage of, for instance, uniformly providing liquid crystal alignment to the organic thin film formed on the substrate.

Specifically, the technical literature of the photoalignment method is as shown in patent literature 6. Patent literature 6 provides a repeating unit having conjugated enone and a liquid crystal alignment agent having an imide structure. However, the liquid crystal display device made by the liquid crystal alignment agent recited in patent literature 6 also has the issue of poor uniformity of pretilt angle after ultraviolet irradiation.

PRIOR TECHNICAL LITERATURES

Patent Literatures

[Patent literature 1] Japanese Laid-Open Patent Publication No. 56-91277

[Patent literature 2] Japanese Laid-Open Publication No. 1-120528

[Patent literature 3] Japanese Laid-Open Publication No. 11-258605

[Patent literature 4] Japanese Laid-Open Publication No. 2002-250924

[Patent literature 5] Japanese Laid-Open Publication No. 2004-83810

[Patent literature 6] Japanese Laid-Open Publication No. 2005-037654

Therefore, how to alleviate the issue of poor uniformity of pretilt angle after ultraviolet irradiation so as to achieve the current industrial needs is a current issue those skilled in the art urgently need to solve.

SUMMARY OF THE INVENTION

Accordingly, the invention provides a liquid crystal alignment agent for a liquid crystal display device. The liquid crystal alignment agent is capable of alleviating the issue of poor uniformity of pretilt angle after ultraviolet irradiation.

The invention provides a liquid crystal alignment agent including a polymer composition (A-1) and a solvent (B). The polymer composition (A-1) is obtained by reacting a tetracarboxylic acid dianhydride compound (a) with a diamine compound (b). The diamine compound (b) includes at least one type of diamine (b-1) represented by formula (I) and at least one type of diamine (b-2) having the structure represented by formula (II).

Specifically, the diamine (b-1) represented by formula (I) is as shown below.

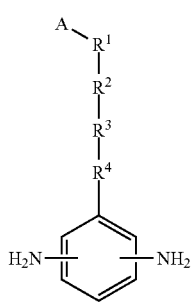

formula (I)

In formula (I), $R^1$ and $R^3$ each independently represent an ether group (—O—), a thioether group (—S—), an ester group (—COO— or —OCO—), or a thioester group (—COS— or —SCO—); $R^2$ represents an alkylene group containing an unsaturated bond; $R^4$ represents a single bond, a methylene group, or an ethylene group; and A represents a $C_{17}$ to $C_{40}$ monovalent organic group having a steroid frame.

Moreover, the diamine (b-2) having the structure represented by formula (II) is as shown below.

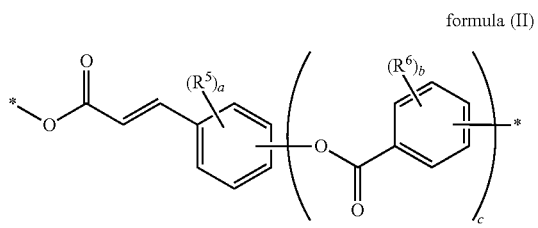

formula (II)

In formula (II), $R^5$ and $R^6$ each independently represent a $C_1$ to $C_6$ alkyl group, a $C_1$ to $C_6$ alkoxy group, a halogen atom, or a cyano group; a and b each independently represent an integer of 0 to 4; c represents 0 or 1; and * each independently represents a bonding position.

In an embodiment of the invention, the diamine (b-2) having the structure represented by formula (II) includes a structure represented by formula (II-1), a structure represented by formula (II-2), or a combination of the two.

In formula (II-1) and formula (II-2), $R^8$, $R^9$, $R^{11}$, and $R^{12}$ each independently represent a $C_1$ to $C_6$ alkyl group, a $C_1$ to $C_6$ alkoxy group, a halogen atom, or a cyano group; $R^{10}$ and $R^{13}$ each independently represent a $C_1$ to $C_{40}$ alkyl group or a $C_1$ to $C_{40}$ alkyl group substituted by a fluorine atom; $Y^1$, $Y^2$, and $Y^3$ each independently represent

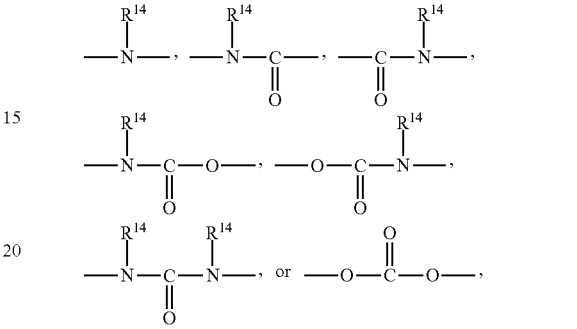

wherein $R^{14}$ represents a hydrogen atom or a $C_1$ to $C_4$ alkyl group; $Z^1$ and $Z^2$ each independently represent a methylene group, an arylene group, a divalent alicyclic group, —Si(CH$_3$)$_2$—, —CH═CH—, —C≡C—, a methylene group having a substituent, an arylene group having a substituent, a divalent alicyclic group having a substituent, —Si(CH$_3$)$_2$— having a substituent, or —CH═CH— having a substituent, wherein the substituent is a cyano group, a halogen atom, or a $C_1$ to $C_4$ alkyl group; d, e, j, and k each independently represent an integer of 0 to 4; f and m represent 0 or 1; g and n each independently represent an integer of 1 to 6; h and p each independently represent an integer of 0 to 2; i represents an integer of 0 or 1; and * each independently represents a bonding position.

In an embodiment of the invention, based on a total number of moles of 100 moles of the diamine compound (b), the usage amount of the diamine (b-1) represented by formula (I) is 0.5 to 50 moles, and the usage amount of the diamine (b-2) having the structure represented by formula (II) is 10 to 80 moles.

In an embodiment of the invention, the molar ratio (b-1)/(b-2) of the diamine (b-1) represented by formula (I) and the diamine (b-2) having the structure represented by formula (II) is 0.05 to 1.5.

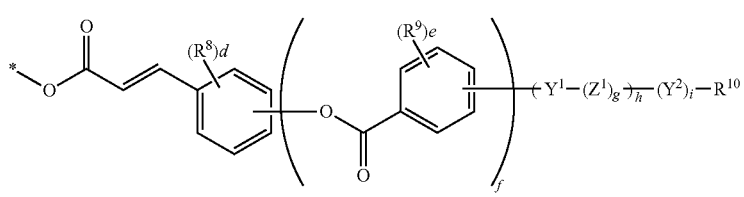

formula (II-1)

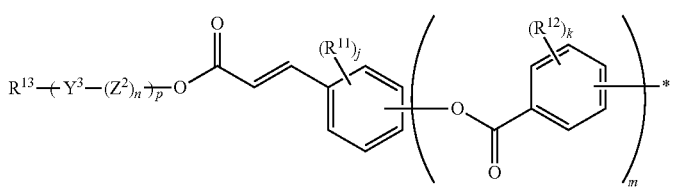

formula (II-2)

In an embodiment of the invention, the molar ratio (b-1)/(b-2) of the diamine (b-1) represented by formula (I) and the diamine (b-2) having the structure represented by formula (II) is 0.1 to 1.3.

In an embodiment of the invention, the molar ratio (b-1)/(b-2) of the diamine (b-1) represented by formula (I) and the diamine (b-2) having the structure represented by formula (II) is 0.2 to 1.0.

The invention further provides a liquid crystal alignment film. The liquid crystal alignment film is formed by the liquid crystal alignment agent above.

The invention further provides a liquid crystal display device. The liquid crystal display device includes the liquid crystal alignment film above.

Based on the above, when the liquid crystal alignment agent of the invention is used to fabricate a liquid crystal display device, the issue of poor uniformity of pretilt angle after ultraviolet irradiation can be alleviated. As a result, the liquid crystal alignment agent is suitable for a liquid crystal alignment film and a liquid crystal display device.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a side view of a liquid crystal display device according to an embodiment of the invention.

DESCRIPTION OF THE EMBODIMENTS

Liquid Crystal Alignment Agent

The invention provides a liquid crystal alignment agent including a polymer composition (A-1) and a solvent (B). Moreover, the liquid crystal alignment agent can further include an additive (C) if needed.

In the following, the individual components of the liquid crystal alignment agent of the invention are described in detail.

It should be mentioned that, in the following, (meth)acrylic acid represents acrylic acid and/or methacrylic acid, and (meth)acrylate represents acrylate and/or methacrylate. Similarly, (meth)acryloyl group represents acryloyl group and/or methacryloyl group.

Polymer Composition (A-1)

The polymer composition (A-1) includes a polyamic acid polymer, a polyimide polymer, a polyimide-based block copolymer, or a combination of the polymers. In particular, the polyimide-based block copolymer includes a polyamic acid block copolymer, a polyimide block copolymer, a polyamic acid-polyimide block copolymer, or a combination of the polymers.

The polyamic acid polymer, the polyimide polymer, and the polyimide-based block copolymer in the polymer composition (A-1) can all be obtained by reacting a tetracarboxylic acid dianhydride compound (a) with a diamine compound (b), wherein the tetracarboxylic acid dianhydride compound (a), the diamine compound (b), and the method of preparing the polymer composition (A-1) are as described below.

Tetracarboxylic Acid Dianhydride Compound (a)

The tetracarboxylic acid dianhydride compound (a) includes, for instance, an aliphatic tetracarboxylic acid dianhydride compound, an alicyclic tetracarboxylic acid dianhydride compound, an aromatic tetracarboxylic acid dianhydride compound, or the tetracarboxylic acid dianhydride compound (a) shown by each of formula (1) to formula (6) below.

Specific examples of the aliphatic tetracarboxylic acid dianhydride compound can include, but are not limited to, an aliphatic tetracarboxylic acid dianhydride such as an ethane tetracarboxylic acid dianhydride or a butane tetracarboxylic acid dianhydride.

Specific examples of the alicyclic tetracarboxylic acid dianhydride compound can include, but are not limited to, an alicyclic tetracarboxylic acid dianhydride compound such as 1,2,3,4-cyclobutane tetracarboxylic acid dianhydride, 1,2-dimethyl-1,2,3,4-cyclobutane tetracarboxylic acid dianhydride, 1,3-dimethyl-1,2,3,4-cyclobutane tetracarboxylic acid dianhydride, 1,3-dichloro-1,2,3,4-cyclobutane tetracarboxylic acid dianhydride, 1,2,3,4-tetramethyl-1,2,3,4-cyclobutane tetracarboxylic acid dianhydride, 1,2,3,4-cyclopentane tetracarboxylic acid dianhydride, 1,2,4,5-cyclohexane tetracarboxylic acid dianhydride, 3,3',4,4'-dicyclohexyl tetracarboxylic acid dianhydride, cis-3,7-dibutyl-cycloheptyl-1,5-diene-1,2,5,6-tetracarboxylic acid dianhydride, 2,3,5-tricarboxycyclopentylacetic acid dianhydride, or bicyclo[2.2.2]-oct-7-ene-2,3,5,6-tetracarboxylic acid dianhydride.

Specific examples of the aromatic tetracarboxylic acid dianhydride compound can include, but are not limited to, for instance, 3,4-dicarboxy-1,2,3,4-tetrahydro-1-naphthalene succinic acid dianhydride, pyromellitic dianhydride, 2,2',3,3'-benzophenone tetracarboxylic acid dianhydride, 3,3',4,4'-benzophenone tetracarboxylic acid dianhydride, 3,3',4,4'-biphenylsulfone tetracarboxylic dianhydride; 1,4,5,8-naphthalene tetracarboxylic acid dianhydride, 2,3,6,7-naphthalene tetracarboxylic acid dianhydride, 3,3'-4,4'-diphenyl ethane tetracarboxylic acid dianhydride, 3,3',4,4'-dimethyl diphenyl silane tetracarboxylic acid dianhydride, 3,3',4,4'-tetraphenyl silane tetracarboxylic acid dianhydride, 1,2,3,4-furan tetracarboxylic acid dianhydride, 2,3,3',4'-diphenyl ether tetracarboxylic acid dianhydride, 3,3',4,4'-diphenyl ether tetracarboxylic acid dianhydride, 4,4'-bis(3,4-dicarboxyphenoxy)diphenylsulfide dianhydride, 2,3,3',4'-diphenyl sulfide tetracarboxylic acid dianhydride, 3,3',4,4'-diphenyl sulfide tetracarboxylic acid dianhydride, 4,4'-bis(3,4-dicarboxyphenoxy)diphenyl sulfone dianhydride, 4,4'-bis(3,4-dicarboxyphenoxy)diphenyl propane dianhydride, 3,3',4,4'-perfluoroisopropylidene diphenyl dicarboxylic acid dianhydride, 2,2',3,3'-diphenyl tetracarboxylic acid dianhydride, 2,3,3',4'-diphenyl tetracarboxylic acid dianhydride, 3,3',4,4'-diphenyl tetracarboxylic acid dianhydride, bis(phthalic acid)phenylsulfinoxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofuran tetracarboxylic acid dianhydride, 1,3,3a,4,5,9b-hexahydro-5-(tetrahydro-2,5-dioxofuran-3-yl)naphtho[1,2-c]furan-1,3- dione, 1,3,3a,4,5,9b-hexahydro-5-methyl-5-(tetrahydro-2,5-dioxofuran-3-yl)naphtho[1,2-c]furan-1,3-dione, 1,3,3a,4,5,9b-hexahydro-5-ethyl-5-(tetrahydro-2,5-dioxofuran-3-yl)naphtho[1,2-c]furan-1,3-dione, 1,3,3a,4,5,9b-hexahydro-7-methyl-5-(tetrahydro-2,5-dioxofuran-3-yl)naphtho[1,2-c]furan-1,3-dione, 1,3,3a,4,5,9b-hexahydro-7-ethyl-5-(tetrahydro-2,5-dioxofuran-3-yl)naphtho[1,2-c]furan-1,3-dione, 1,3,3a,4,5,9b-hexahydro-8-methyl-5-(tetrahydro-2,5-dioxofuran-3-yl) naphtho[1,2-c]furan-1,3-dione, 1,3,3a,4,5,9b-hexahydro-8-ethyl-5-(tetrahydro-2,5-dioxofuran-3-yl) naphtho[1,2-c]furan-1,3-dione, 1,3,3a,4,5,9b-hexahydro-5,8-dimethyl-5-(tetrahydro-2,5-dioxofuran-3-yl)naphtho[1,2-c]furan-1,3-dione, or 5-(2,5-dioxotetrahydrofuranyl)-3-methyl-3-cyclohexene-1,2-dicarboxylic acid dianhydride.

The tetracarboxylic acid dianhydride compound (a) represented by each of formula (1) to formula (6) is as shown below.

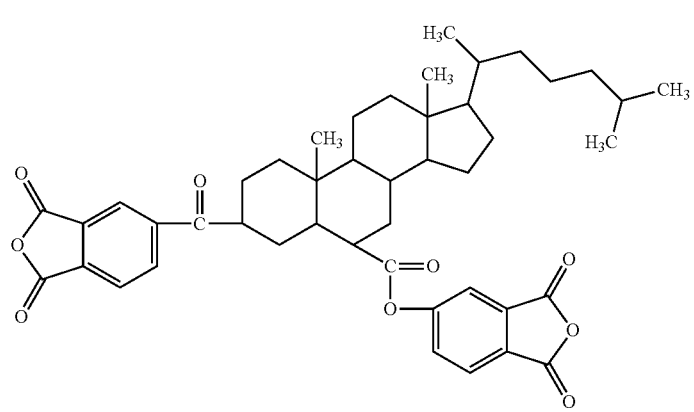

formula (1)

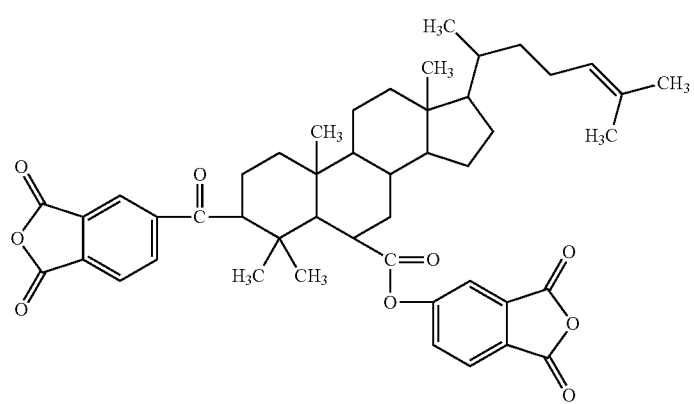

formula (2)

formula (3)

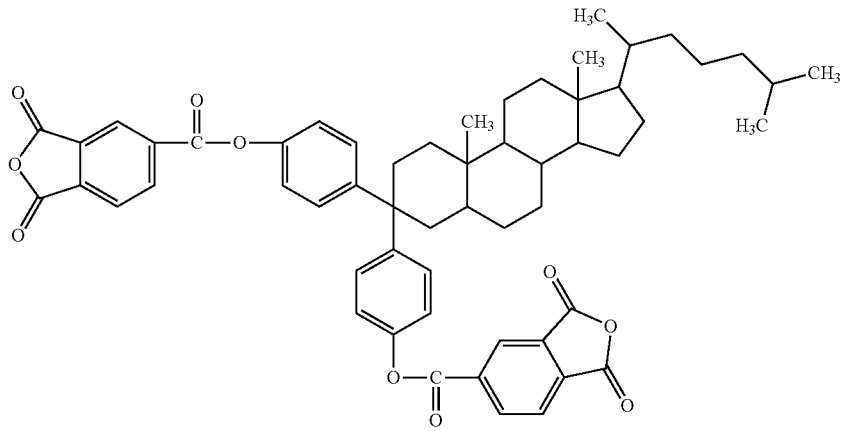

formula (4)

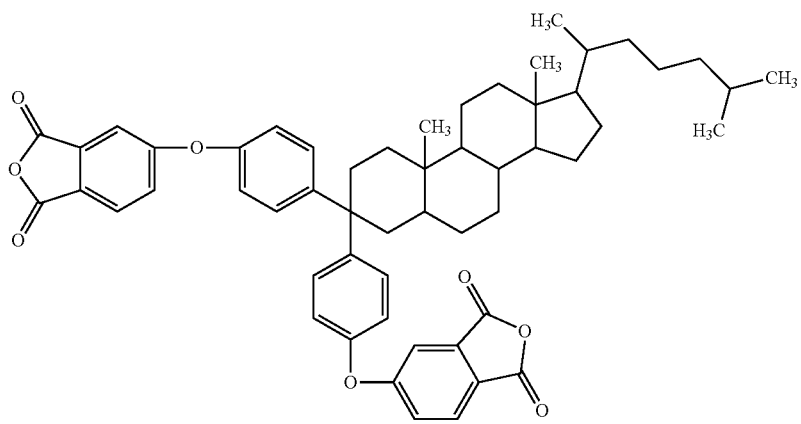

formula (5)

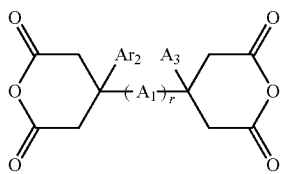

In formula (5), $A_1$ represents a divalent group containing an aromatic ring; r represents an integer of 1 to 2; and $A_2$ and $A_3$ can be the same or different, and can each independently represent a hydrogen atom or an alkyl group. The tetracarboxylic acid dianhydride compound (a) represented by formula (5) is preferably a compound represented by each of formula (5-1) to formula (5-3).

formula (5-2)

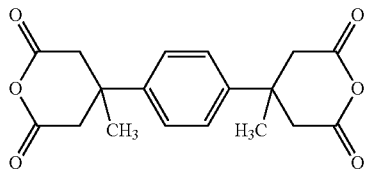

formula (5-1)

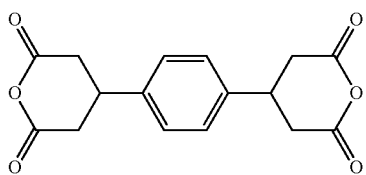

formula (5-3)

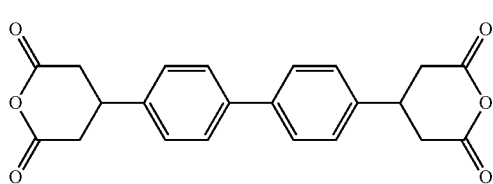

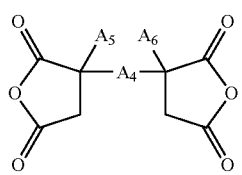

In formula (6), $A_4$ represents a divalent group containing an aromatic ring; and $A_5$ and $A_6$ can be the same or different, and each independently represent a hydrogen atom or an alkyl group. The tetracarboxylic acid dianhydride compound (a) represented by formula (6) is preferably a compound represented by formula (6-1).

formula (6-1)

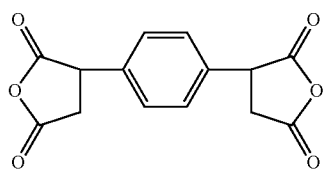

The tetracarboxylic acid dianhydride compound (a) preferably includes, but is not limited to, 1,2,3,4-cyclobutane tetracarboxylic acid dianhydride, 1,2,3,4-cyclopentane tetracarboxylic acid dianhydride, 2,3,5-tricarboxycyclopentylacetic acid dianhydride, 1,2,4,5-cyclohexane tetracarboxylic acid dianhydride, 3,4-dicarboxy-1,2,3,4-tetrahydro-1-naphthalene succinic acid dianhydride, pyromellitic dianhydride, 3,3',4,4'-benzophenone tetracarboxylic dianhydride, or 3,3',4,4'-biphenylsulfone tetracarboxylic dianhydride. The tetracarboxylic acid dianhydride compound (a) can be used alone or in multiple combinations.

Diamine Compound (b)

The diamine compound (b) includes a diamine (b-1), a diamine (b-2), a diamine (b-3), and a combination of the diamines, wherein the diamine compound (b) includes at least one type of the diamine (b-1) represented by formula (I) and at least one type of the diamine (b-2) having the structure represented by formula (II). The diamine (b-1), the diamine (b-2), and the diamine (b-3) are described in detail below.

Diamine (b-1)

The diamine (b-1) is a compound represented by formula (I). Specifically, the diamine (b-1) represented by formula (I) is as shown below.

formula (I)

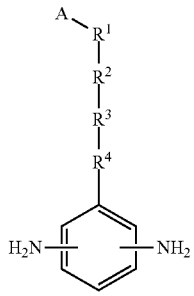

In formula (I), $R^1$ and $R^3$ each independently represent an ether group (—O—), a thioether group (—S—), an ester group (—COO— or —OCO—), or a thioester group (—COS— or —SCO—); $R^2$ represents an alkylene group containing an unsaturated bond; $R^4$ represents a single bond, a methylene group, or an ethylene group; and A represents a $C_{17}$ to $C_{40}$ monovalent organic group having a steroid frame. When $R^1$ and $R^3$ are an ester group or a thioester group, the direction of the ester group or the thioester group is not limited. In other words, the "ester group" here can be

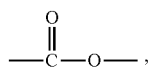

and can also be

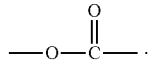

The "thioester group" can be

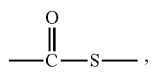

and can also be

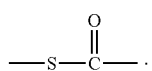

The steroid frame in A of formula (I) refers to a cyclopentane-perhydrophenanthrene frame or a frame in which one or a plurality of carbon-carbon bonds contained therein is changed to a double bond. The A group having such a steroid frame can be, for instance, a group each independently represented by formula (A-1) to (A-4) below.

formula (A-1)

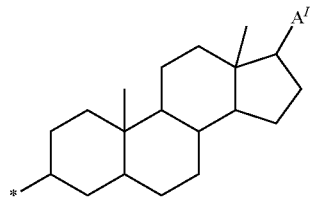

formula (A-2)

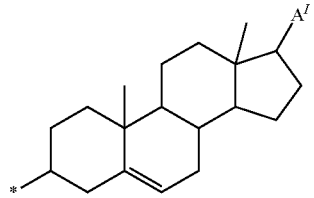

-continued formula (A-3)

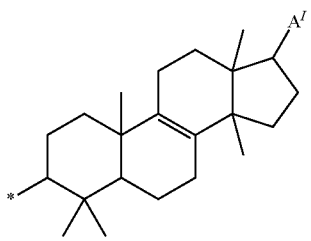

formula (A-1-1)

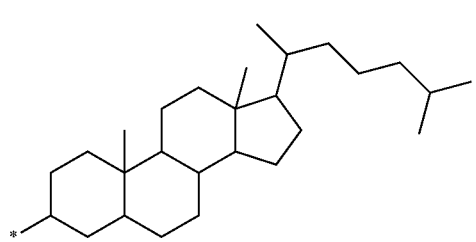

formula (A-4)

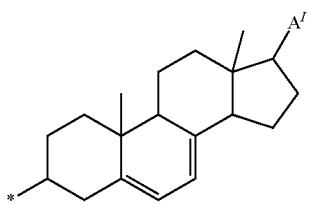

formula (A-2-1)

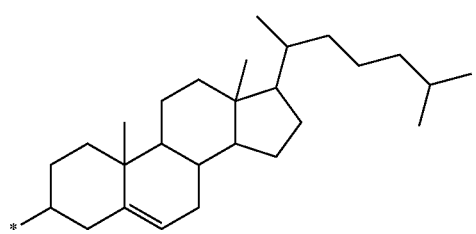

$A^I$ in the formulae above each independently represents a group represented by any one of the following, and "*" each independently represents a bonding position.

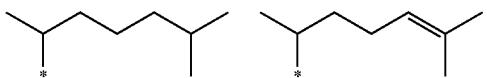

formula (A-3-1)

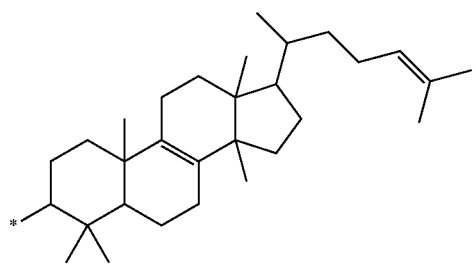

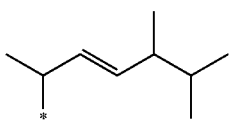

formula (A-4-1)

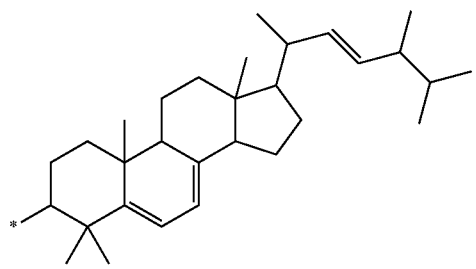

Specific examples of the A group include structures represented by formula (A-1-1), formula (A-2-1), formula (A-3-1), or formula (A-4-1).

The compound represented by formula (I) is as the compound represented by each of formula (I-1) to formula (I-22) below.

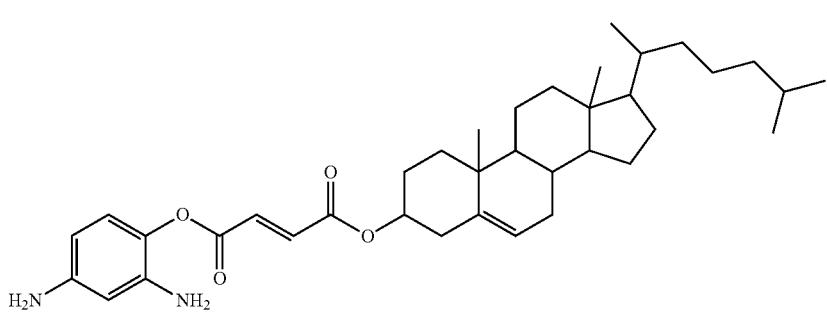
formula (I-1)
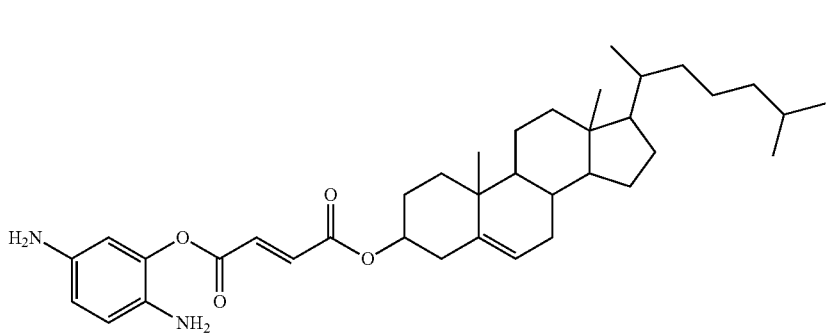
formula (I-2)
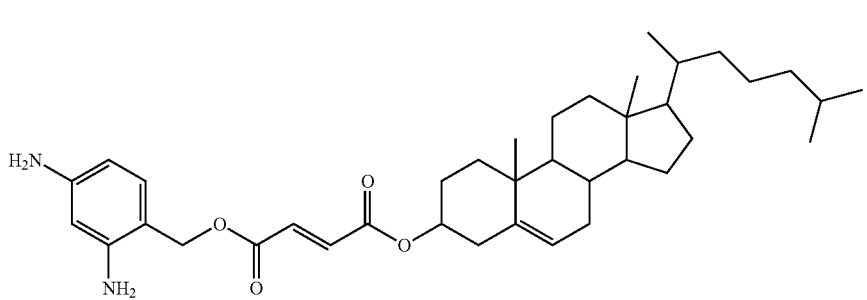
formula (I-3)
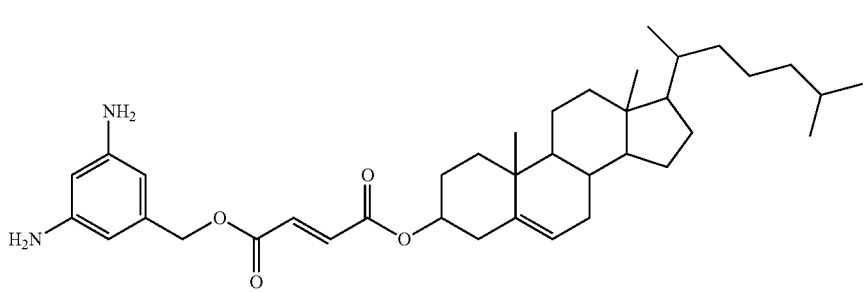
formula (I-4)
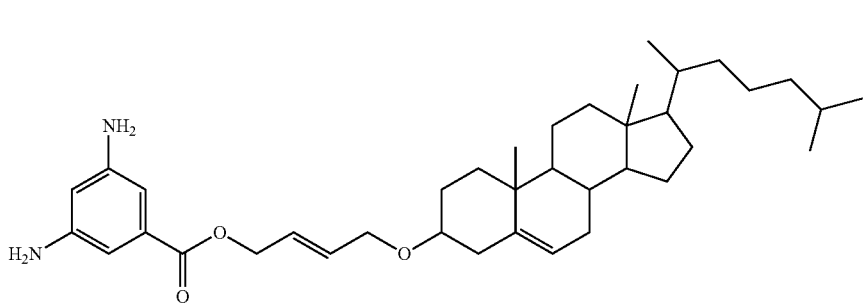
formula (I-5)

formula (I-6)
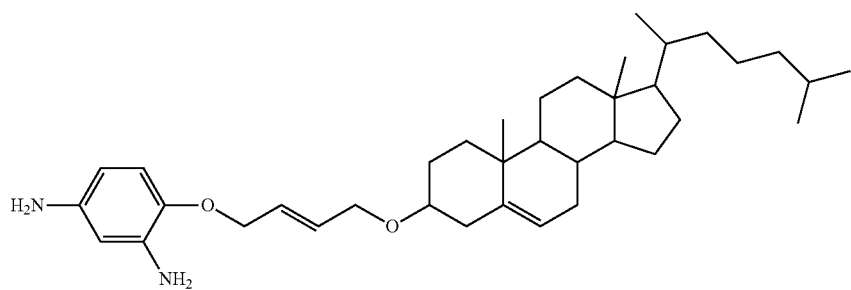
formula (I-7)
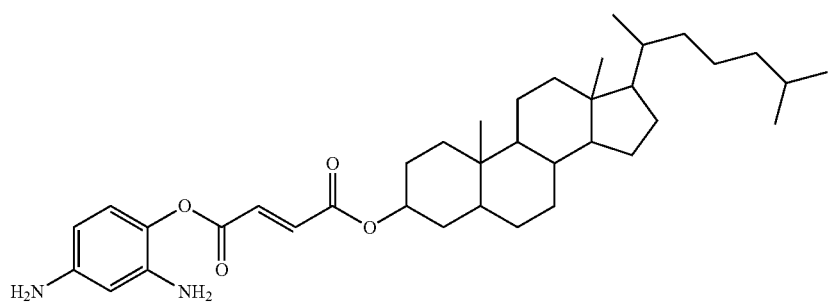
formula (I-8)
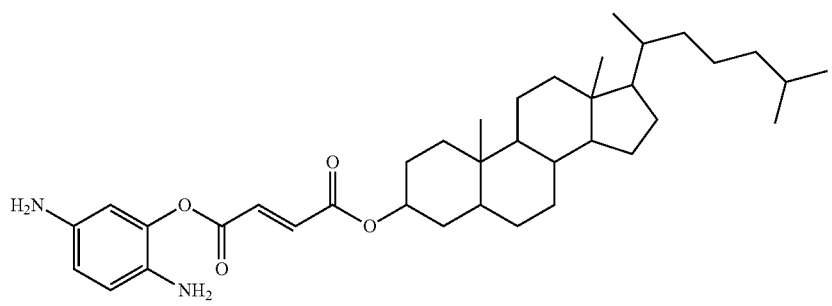
formula (I-9)
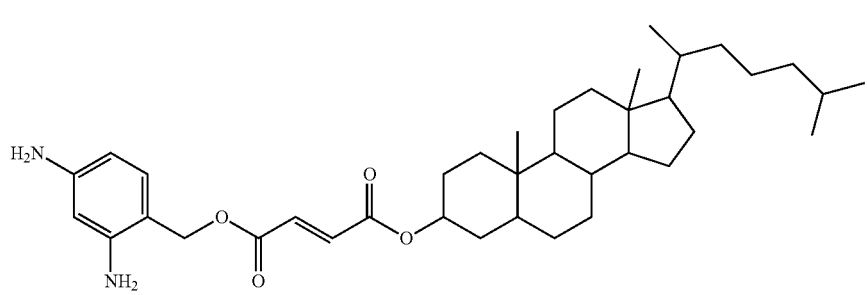
formula (I-10)
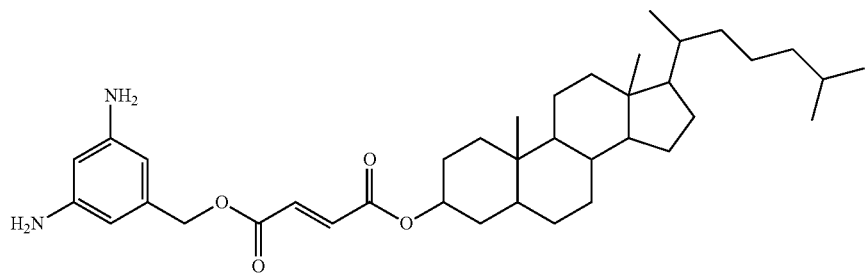

-continued
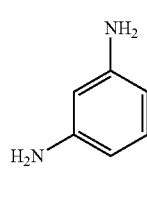
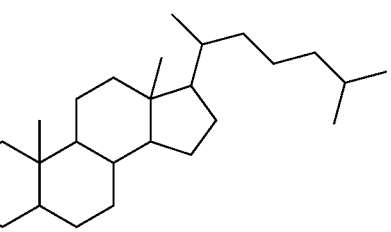
formula (I-11)
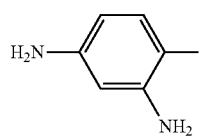
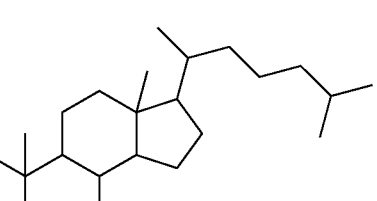
formula (I-12)
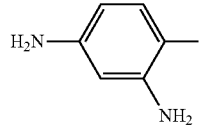
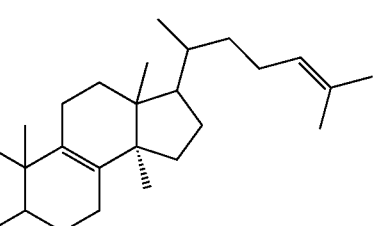
formula (I-13)
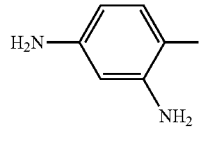
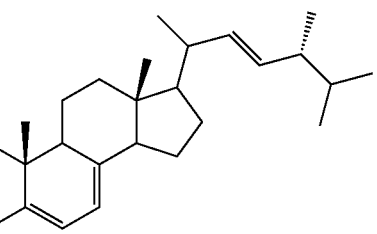
formula (I-14)
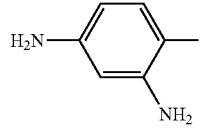
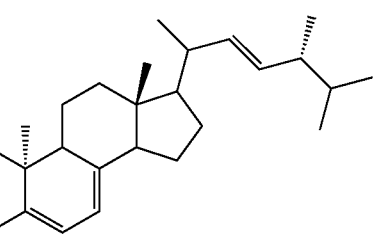
formula (I-15)

formula (I-16)
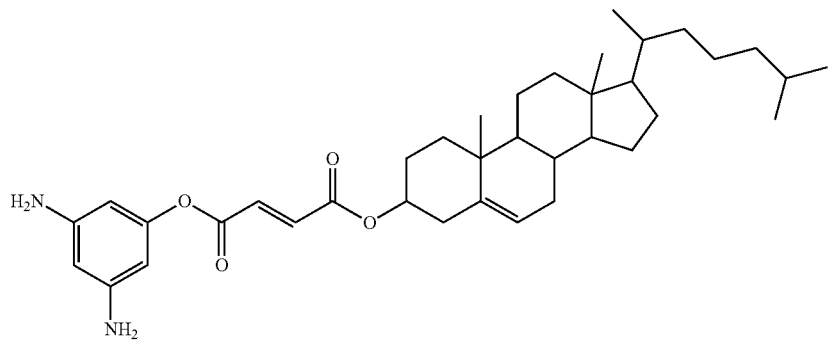
formula (I-17)
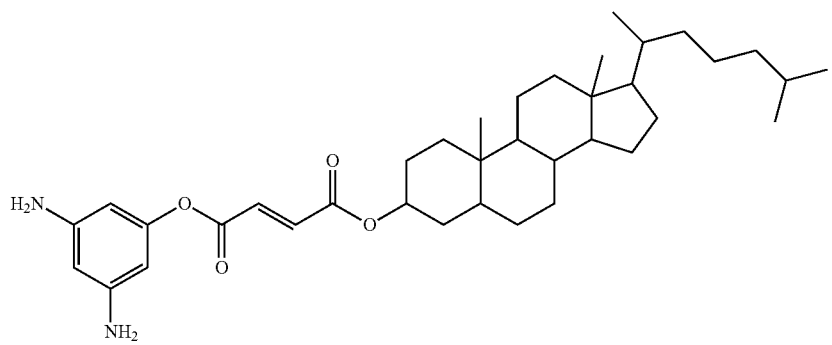
formula (I-18)
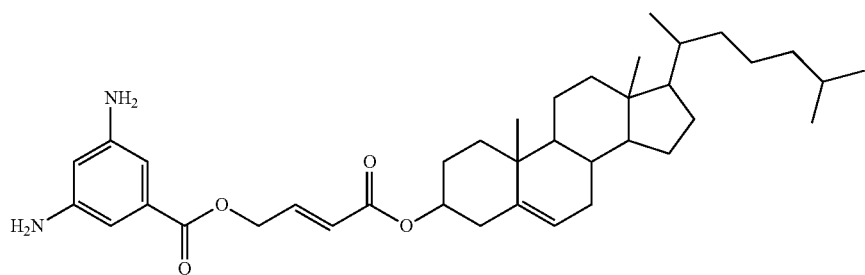
formula (I-19)
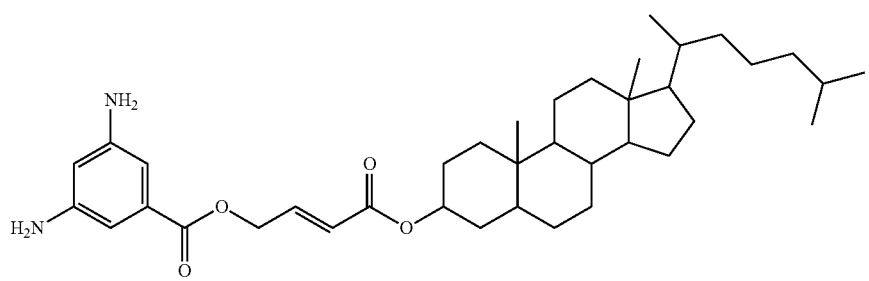
formula (I-20)
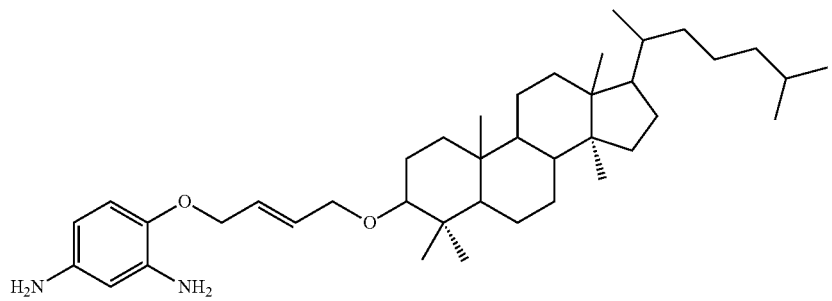

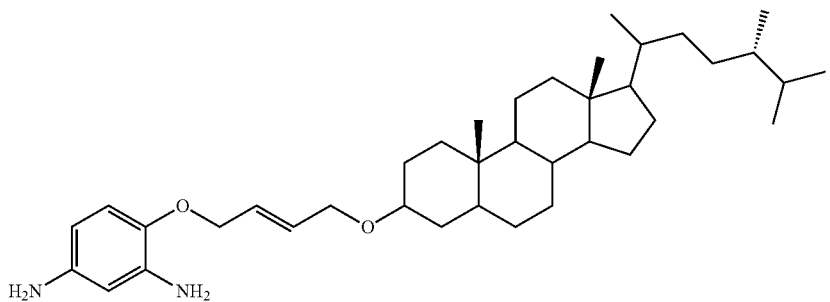

formula (I-21)

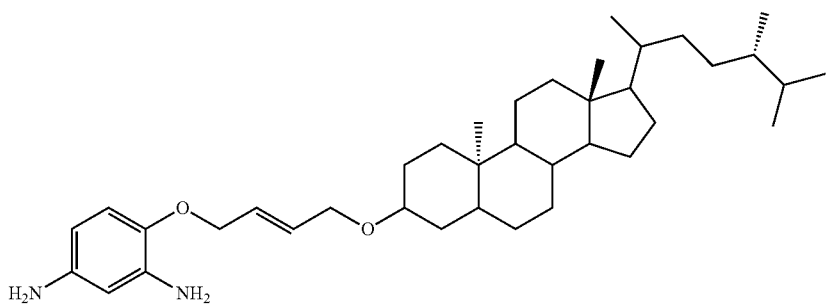

formula (I-22)

For instance, the compound represented by formula (I-1), formula (I-2), formula (I-7), or formula (I-8) above can be synthesized by the following method. First, after maleic anhydride is added to cholesterol or cholestanol, acid chloride is made by, for instance, dichloro sulfoxide. Then, after acid chloride is reacted with dinitrophenol under the existence of a base in an equivalent or more, reduction is performed by using a suitable reducing agent such as tin chloride.

The compound represented by formula (I-3), formula (I-4), formula (I-9), or formula (I-10) can be synthesized by the following method. First, after maleic anhydride is added to cholesterol or cholestanol, an ester forming reaction is performed on the adduct and dinitrobenzoyl chloride under the existence of potassium carbonate. Then, reduction is performed by using a suitable reducing agent such as tin chloride.

The compound represented by formula (I-5) or formula (I-11) can be synthesized by the following method. First, tosylation is performed on cholesterol or cholestanol by using, for instance, toluenesulfonyl chloride; the obtained tosylated cholesterol or tosylated cholestanol is reacted with dinitrobenzoyl chloride and excessive 2-butene-1,4-diol under the existence of a base to synthesize and obtain dinitrobenzoyl-2-butene-1,4-diol monoester. Then, dinitrobenzoyl-2-butene-1,4-diol monoester and the tosylated cholestanol are heated in a suitable organic solvent to form an ether group. Then, reduction is performed by using a suitable reducing agent such as tin chloride.

The compound represented by formula (I-5) or formula (I-11) can also be synthesized by the following method. First, after cholesterol or cholestanol is reacted by using methanesulfonyl chloride, a displacement reaction is performed by using excessive 2-butene-1,4-diol to synthesize a monoether compound. Then, after the monoether compound is reacted with 3,5-dinitrobenzoyl chloride under the existence of a base to synthesize a dinitro compound, reduction is performed on the nitro group by using a suitable reducing agent such as palladium carbon.

The compound represented by formula (I-6) or formula (I-12) can be synthesized by the following method. First, after maleic anhydride is added to cholesterol or cholestanol, a carbonyl group of the adduct is reduced to a methylene group by using, for instance, lithium aluminum hydride. Then, after the reductant is reacted with 2,4-dinitrochlorobenzene in an ester forming reaction under the existence of a base such as potassium tert-butoxide, reduction is performed by using a suitable reducing agent such as tin chloride. Alternatively, the tosylated cholesterol or the tosylated cholestanol obtained with the same method is reacted with 2,4-dinitrochlorobenzene and excessive 2-butene-1,4-diol under the existence of a base such as potassium tert-butoxide to obtain 1-(1-hydroxy-2-butenyloxy)-2,4-diaminobenzene. Then, after an ether group is formed in a suitable organic solvent by heating, reduction is performed by using a suitable reducing agent such as tin chloride.

The compound represented by formula (I-13), formula (I-14), or formula (I-15) can be synthesized by the following method. In addition to using lanosterol, ergosterol, or lumisterol as a starting material, the compound represented by formula (I-13), formula (I-14), or formula (I-15) can be synthesized by using the synthesis method of the compound represented by formula (I-6).

The compound represented by formula (I-16) or formula (I-17) can be synthesized by the following method. First, after maleic anhydride is added to cholesterol or cholestanol, the adduct is reacted with 3,5-(N,N-diallyl)aminophenol by using N,N-dicyclohexyl carbodiimide. Then, allyl is removed with 1,3-dimethyl barbituric acid and tetrakistriphenylphosphinepalladium.

The compound represented by formula (I-18) or formula (I-19) can be synthesized by the following method. First, after maleic anhydride is added to cholesterol or cholestanol, a carbonyl group is reduced by using a borane-oxygen bridge complex to obtain an alcohol intermediate. Then, the intermediate is reacted with 3,5-dinitrobenzoyl chloride under the existence of a base to synthesize a dinitro compound. Next, reduction is performed on the nitro group by using a suitable reducing agent such as palladium chloride.

The compound represented by formula (I-20), formula (I-21), or formula (I-22) can be synthesized by the following method. In addition to performing hydrogenation on the raw material of lanosterol, ergosterol, or lumisterol by using a suitable hydrogenation catalyst and then reusing the raw material, the compound represented by formula (I-20), formula (I-21), or formula (I-22) can respectively be obtained in the same way as the compound represented by formula (I-13), (I-14), or (I-15).

Specific examples of the diamine (b-1) preferably include diamines represented by formula (I-10), formula (I-11), formula (I-19), or formula (I-17), or any combination of the diamines.

Based on a total number of moles of 100 moles of the diamine compound (b), the usage amount of the diamine (b-1) represented by formula (I) is 0.5 to 50 moles, preferably 1.0 mole to 45 moles, and more preferably 1.5 moles to 40 moles. When the diamine (b-1) represented by formula (I) is not used in the liquid crystal alignment agent, the uniformity of pretilt angle of the liquid crystal display device after ultraviolet irradiation is poor.

Diamine (b-2)

The diamine (b-2) of the invention is a diamine having a photoreactive structure. The photoreactive structure is preferably a structure having at least one reaction function selected from isomerization and dimerization through light irradiation.

Specifically, the diamine (b-2) is a compound having the structure represented by formula (II).

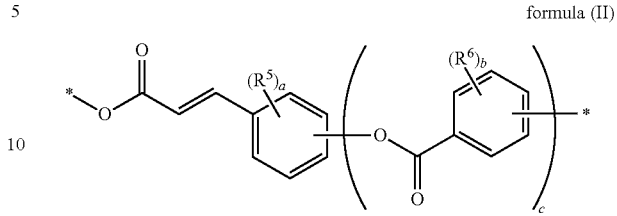

formula (II)

In formula (II), $R^5$ and $R^6$ each independently represent a $C_1$ to $C_6$ alkyl group, a $C_1$ to $C_6$ alkoxy group, a halogen atom, or a cyano group; a and b each independently represent an integer of 0 to 4; c represents 0 or 1; and * each independently represents a bonding position.

More specifically, the diamine having a photoreactive structure preferably further contains a part having the function of aligning liquid crystal molecules. The diamine (b-2) having a photoreactive structure has the structure represented by formula (II), wherein the structure represented by formula (II) includes a structure represented by formula (II-1), a structure represented by formula (II-2), or a combination of the two.

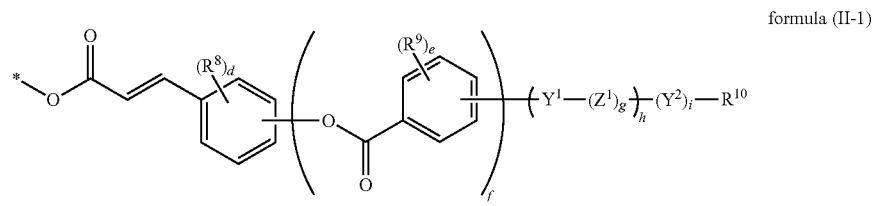

formula (II-1)

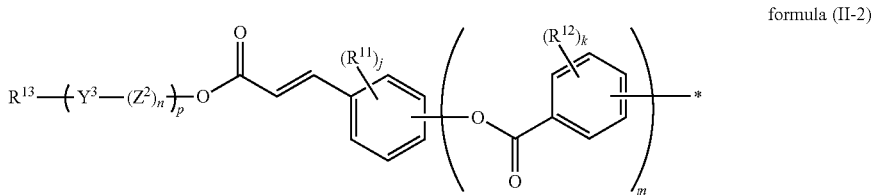

formula (II-2)

In formula (II-1) and formula (II-2), $R^8$, $R^9$, $R^{11}$, and $R^{12}$ each independently represent a $C_1$ to $C_6$ alkyl group, a $C_1$ to $C_6$ alkoxy group, a halogen atom, or a cyano group; $R^{10}$ and $R^{13}$ each independently represent a $C_1$ to $C_{40}$ alkyl group or a $C_1$ to $C_{40}$ alkyl group substituted by a fluorine atom; $Y^1$, $Y^2$, and $Y^3$ each independently represent

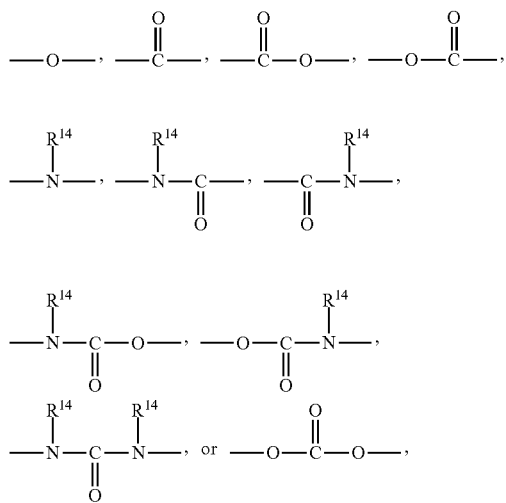

wherein $R^{14}$ represents a hydrogen atom or a $C_1$ to $C_4$ alkyl group, and preferably each independently represents —O—; $Z^1$ and $Z^2$ each independently represent a methylene group, an arylene group, a divalent alicyclic group, —Si(CH$_3$)$_2$—, —CH=CH—, —C≡C—, a methylene group having a substituent, an arylene group having a substituent, a divalent alicyclic group having a substituent, —Si(CH$_3$)$_2$— having a substituent, or —CH=CH— having a substituent, wherein the substituent is a cyano group, a halogen atom, or a $C_1$ to $C_4$ alkyl group; when a plurality of $Y^1$, $Y^3$, $Z^1$, and $Z^2$ exist, $Y^1$, $Y^3$, $Z^1$, and $Z^2$ can each be the same or different; d, e, j, and k each independently represent an integer of 0 to 4; f and m represent 0 or 1; g and n each independently represent an integer of 1 to 6; h and p each independently represent an integer of 0 to 2; i represents an integer of 0 or 1; and * each independently represents a bonding position.

Here, the $C_1$ to $C_{40}$ alkyl group substituted by a fluorine atom is a $C_1$ to $C_{40}$ alkyl group in which a portion or all of the hydrogen atoms are substituted by fluorine atoms. The $C_1$ to $C_{40}$ alkyl group is preferably, for instance, a $C_1$ to $C_{20}$ alkyl group, and a portion or all of the hydrogen atoms of the alkyl group can be substituted by fluorine atoms.

In the $C_1$ to $C_{40}$ alkyl group substituted by a fluorine atom, specific examples of the alkyl group include, for instance, n-pentyl, n-hexyl, n-heptyl, n-octyl, n-nonyl, n-decyl, n-lauryl, n-dodecyl, n-tridecyl, n-tetradecyl, n-pentadecyl, n-hexadecyl, n-heptadecyl, n-octadecyl, n-nonadecyl, n-eicosyl, 4,4,4-trifluorobutyl, 4,4,5,5,5-pentafluoropentyl, 4,4,5,5,6,6-heptafluorohexyl, 3,3,4,4,5,5,5-heptafluoropentyl, 2,2,2-trifluoroethyl, 2,2,3,3,3-pentafluoropropyl, 2-(perfluorobutyl)ethyl, 2-(perfluorooctyl)ethyl, or 2-(perfluorodecyl)ethyl.

The $C_1$ to $C_{40}$ alkyl group substituted by a fluorine atom is preferably a straight-chain or branched-chain $C_1$ to $C_{16}$ fluoroalkyl group. Moreover, from the viewpoint of exhibiting good liquid crystal alignment, the $C_1$ to $C_{40}$ alkyl group substituted by a fluorine atom is preferably a $C_1$ to $C_8$ straight-chain fluoroalkyl group. The $C_1$ to $C_{40}$ alkyl group substituted by a fluorine atom is preferably a $C_3$ to $C_6$ straight-chain fluoroalkyl group such as 2,2,2-trifluoroethyl, 3,3,3-trifluoro-n-propyl, 4,4,4-trifluoro-n-butyl, 4,4,5,5,5-pentafluoro-n-pentyl, or 4,4,5,5,6,6-heptafluoro-n-hexyl, and is more preferably 2,2,2-trifluoroethyl, 3,3,3-trifluoro-n-propyl, 4,4,4-trifluoro-n-butyl, or 4,4,5,5,5-pentafluoro-n-pentyl.

The diamine (b-2) having a photoreactive structure only needs to have at least 1 or 2 of the photoalignment structure in the molecules, and preferably has 1 or 2 of the structure.

Specific examples of the diamine (b-2) having the structure represented by formula (II-1) include compounds represented by formula (II-1-1) to formula (II-1-25).

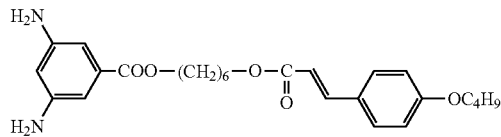

formula (II-1-1)

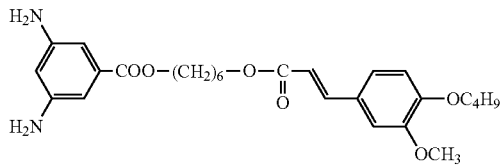

formula (II-1-2)

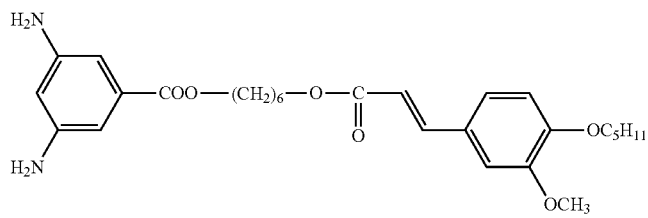

formula (II-1-3)

-continued
formula (II-1-4)
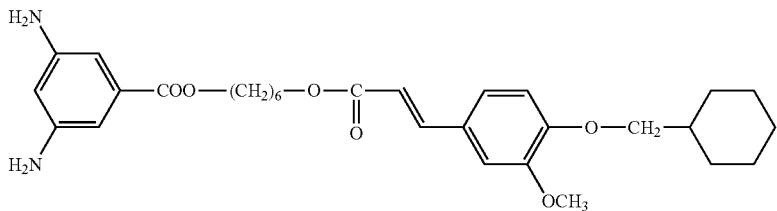
formula (II-1-5)
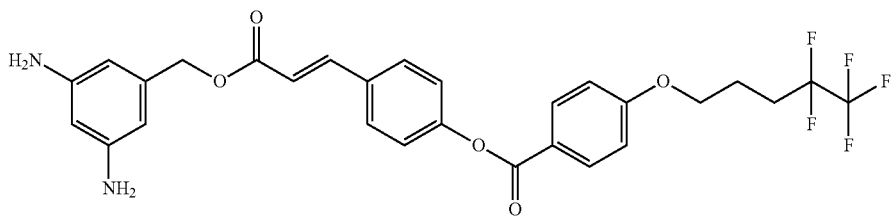
formula (II-1-6)
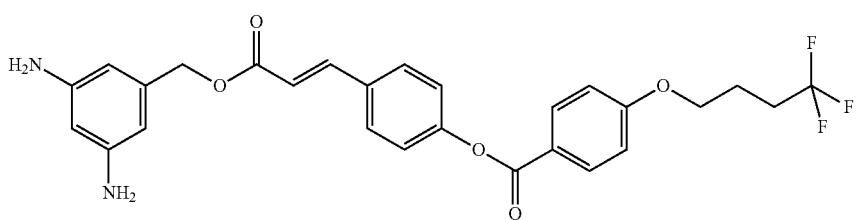
formula (II-1-7)
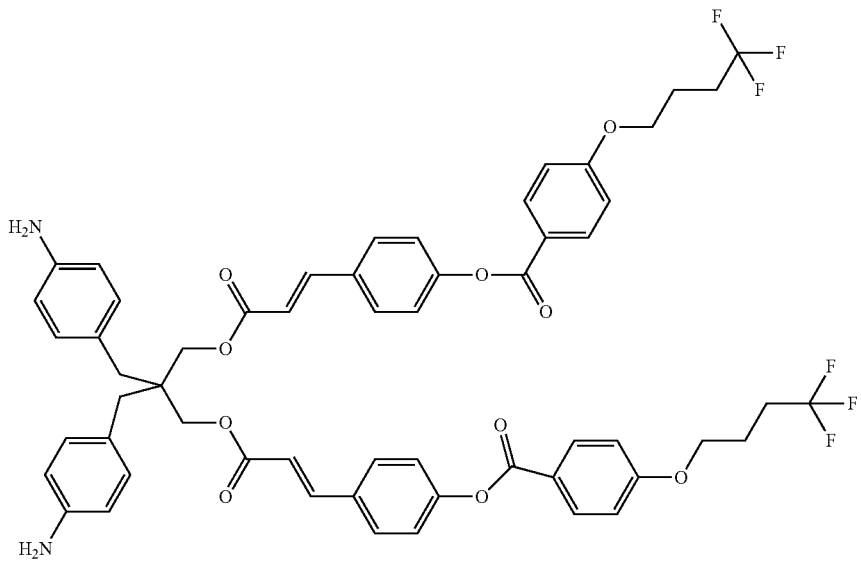
formula (II-1-8)
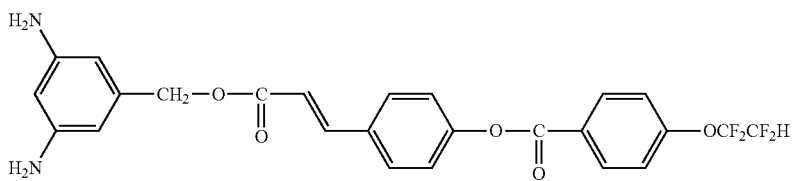
formula (II-1-9)
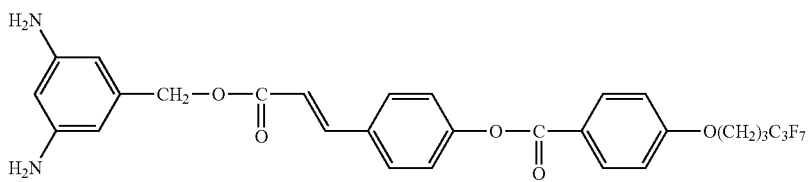

-continued
formula (II-1-10)
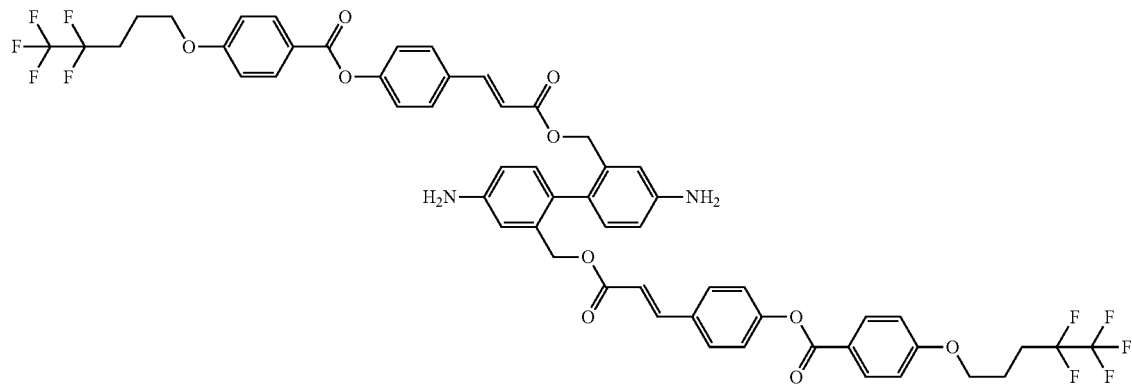
formula (II-1-11)
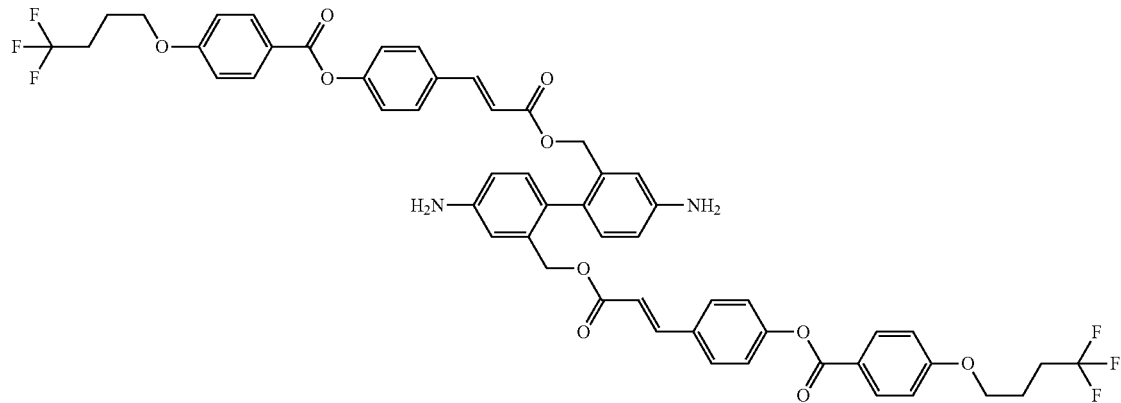
formula (II-1-12)
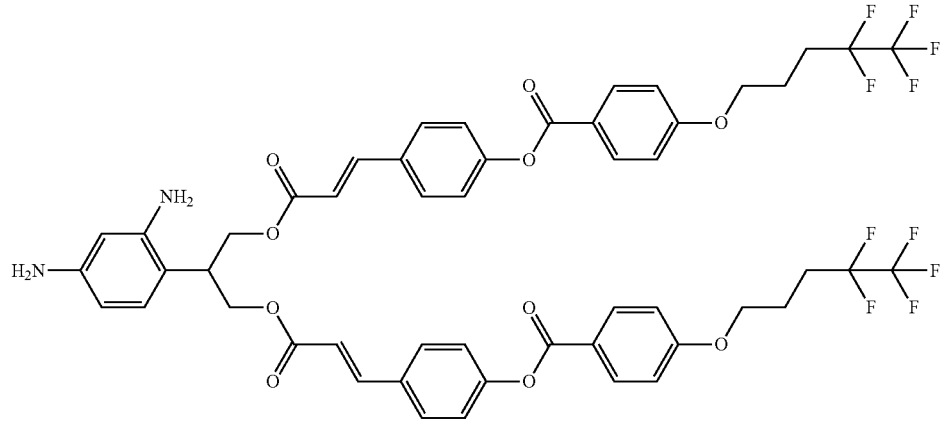
formula (II-1-13)
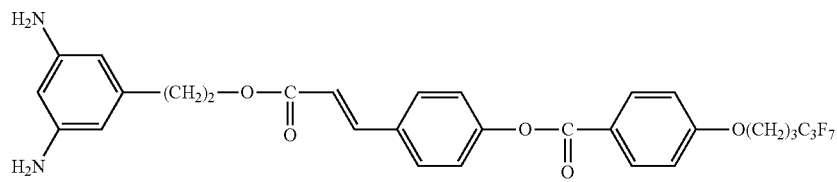

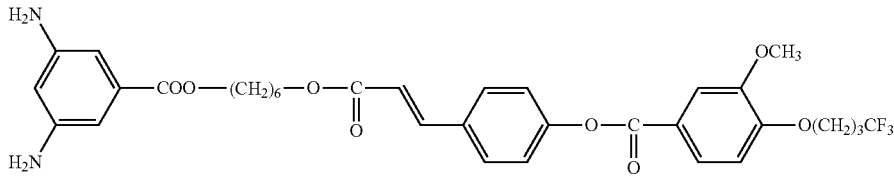
formula (II-1-14)
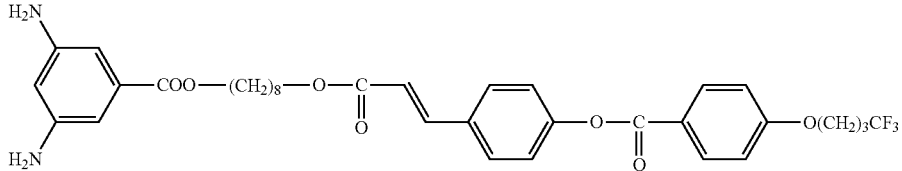
formula (II-1-15)
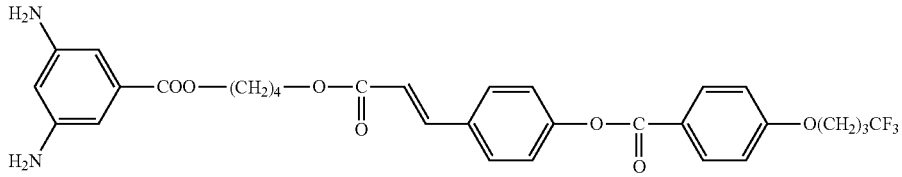
formula (II-1-16)
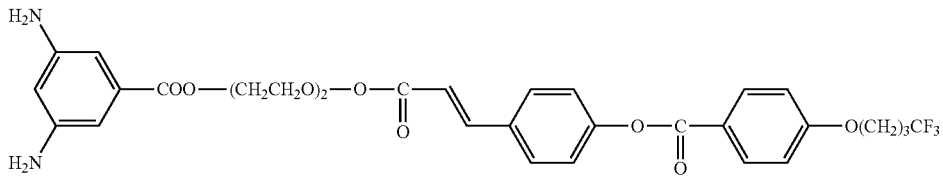
formula (II-1-17)
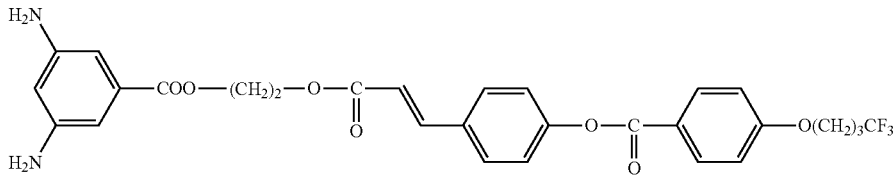
formula (II-1-18)
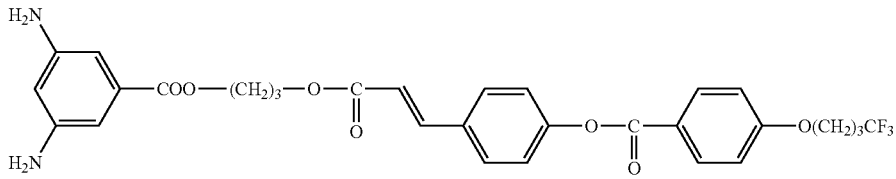
formula (II-1-19)
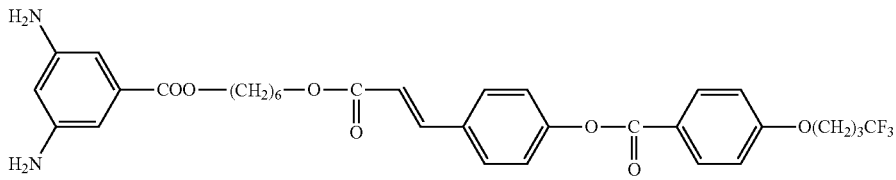
formula (II-1-20)
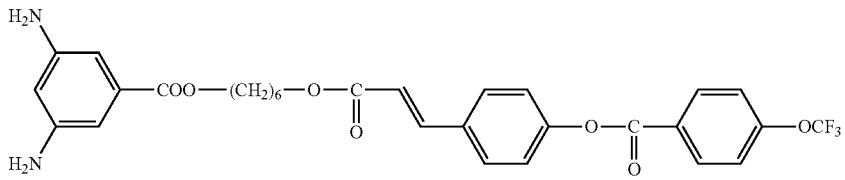
formula (II-1-21)

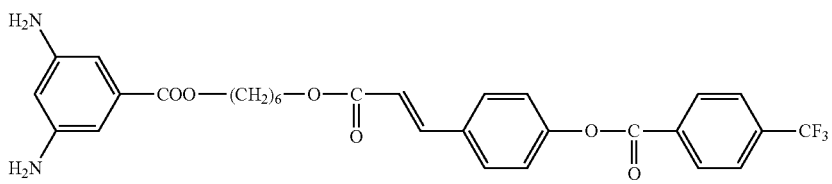

formula (II-1-22)

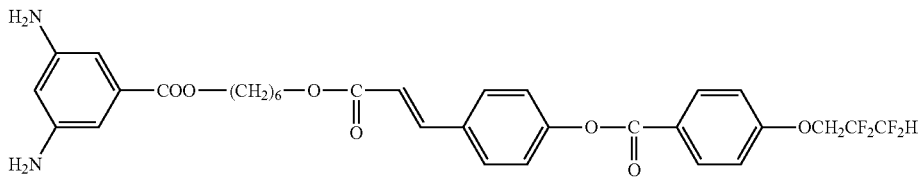

formula (II-1-23)

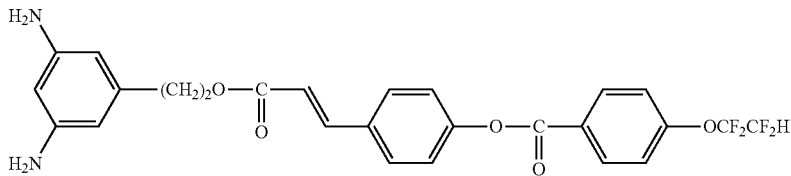

formula (II-1-24)

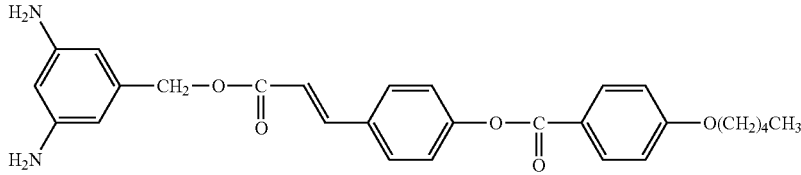

formula (II-1-25)

Specific examples of the diamine (b-2) having the structure represented by formula (II-2) include compounds represented by formula (II-2-1) to formula (II-2-2).

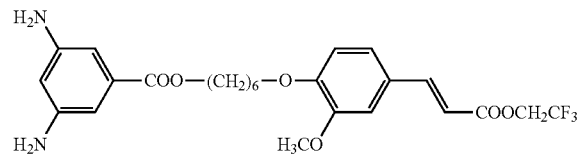

formula (II-2-1)

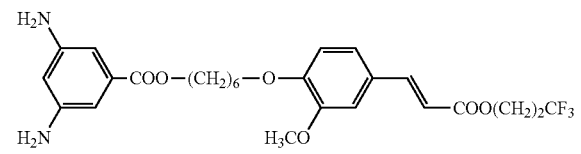

formula (II-2-2)

Specific examples of the diamine (b-2) preferably include diamines represented by formula (II-1-3), formula (II-1-6), formula (II-2-1), or formula (II-1-7), or any combination of the diamines.

Based on a total number of moles of 100 moles of the diamine compound (b), the usage amount of the diamine (b-2) having the structure represented by formula (II) is 10 to 80 moles, preferably 15 mole to 70 moles, and more preferably 20 moles to 60 moles. When the diamine (b-2) having the structure represented by formula (II) is not used in the liquid crystal alignment agent, the uniformity of pretilt angle of the liquid crystal display device after ultraviolet irradiation is poor.

The diamine compound (b) includes at least one type of diamine (b-1) represented by formula (I) and at least one type of diamine (b-2) having the structure represented by formula (II). The molar ratio (b-1)/(b-2) of the diamine (b-1) represented by formula (I) and the diamine (b-2) having the structure represented by formula (II) is 0.05 to 1.5, preferably 0.1 to 1.3, and more preferably 0.2 to 1.0. When the molar ratio (b-1)/(b-2) is in the above ranges, the uniformity of pretilt angle of the liquid crystal display device after ultraviolet irradiation is better.

Other Diamines (b-3)

Specific examples of the other diamines (b-3) can include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, 4,4'-diaminodicyclohexylmethane, 4,4'-diamino-3,3'-dimethyldicyclohexylamine, 1,3-diaminocyclohexane, 1,4-diaminocyclohexane, isophorone diamine, tetrahydrodicyclopentadiene diamine, tricyclo[6.2.1.0$^{2,7}$]-undecylenedimethyldiamine, 4,4'-methylenebis(cyclohexylamine), 4,4'-diaminodiphenylmethane, 4,4'-diaminodiphenylethane, 4,4'-diaminodiphenylsulfone, 4,4'-diaminobenzanilide, 4,4'-diaminodiphenyl ether, 3,4'-diaminodiphenyl ether, 1,5-diaminonaphthalene, 5-amino-1-(4'-aminophenyl)-1,3,3-trimethyl indane, 6-amino-1-(4'-aminophenyl)-1,3,3-trimethyl indane, hexahydro-4,7-methanoindanylenedimethylenediamine, 3,3'-diamino benzophenone, 3,4'-diamino benzophenone, 4,4'-diamino benzophenone, 2,2-bis[4-(4-aminophenoxyl)phenyl]propane, 2,2-bis[4-(4-aminophenoxyl)phenyl]hexafluoropropane, 2,2-bis(4-aminophenyl)hexafluoropropane, 2,2-bis[4-(4-aminophenoxyl)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)-10-hydroanthracene, 2,7-diaminofluorene, 9,9-bis(4-aminophenyl)fluorene, 4,4'-methylene-bis(2-chloroaniline), 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, 4,4'-bis[(4-amino-2-trifluoromethyl)phenoxy]-octafluorobiphenyl, 5-[4-(4-n-pentylcyclohexyl)cyclohexyl]phenylmethylene-1,3-diaminobenzene, 1,1-bis[4-(4-aminophenoxyl)phenyl]-4-(4-ethylphenyl)cyclohexane, or the other diamines (b-3) represented by formula (III-1) to formula (II-25).

Specifically, the other diamines (b-3) represented by formula (III-1) to formula (III-25) are as shown below.

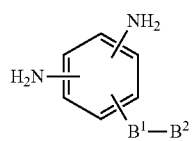

formula (III-1)

In formula (III-1), $B^1$ represents

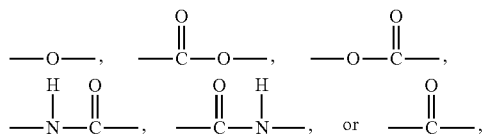

$B^2$ represents a steroid-containing group, a trifluoromethyl group, a fluorine group, a $C_2$ to $C_{30}$ alkyl group, or a monovalent group containing a nitrogen atom ring structure derived from, for instance, pyridine, pyrimidine, triazine, piperidine, and piperazine.

The other diamines (b-3) represented by formula (III-1) are preferably 2,4-diaminophenyl ethyl formate, 3,5-diaminophenyl ethyl formate, 2,4-diaminophenyl propyl formate, 3,5-diaminophenyl propyl formate, 1-dodecoxy-2,4-diaminobenzene, 1-hexadecoxy-2,4-diaminobenzene, 1-octadecoxy-2,4-diaminobenzene, or the other diamines (b-3) represented by formula (III-1-1) to formula (III-1-4) below.

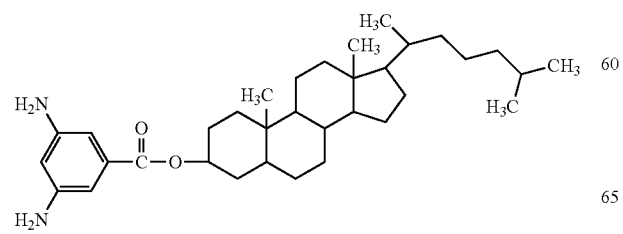

formula (III-1-1)

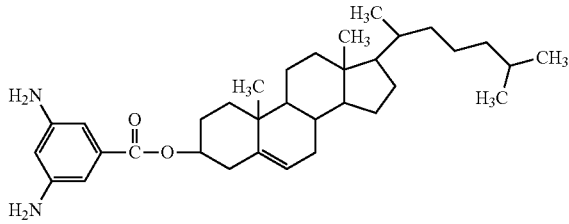

formula (III-1-2)

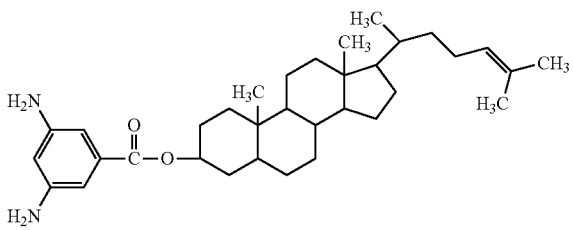

formula (III-1-3)

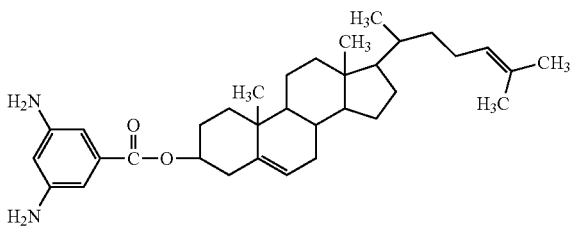

formula (III-1-4)

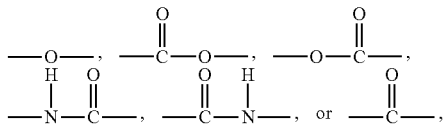

formula (III-2)

In formula (III-2), $B^3$ represents

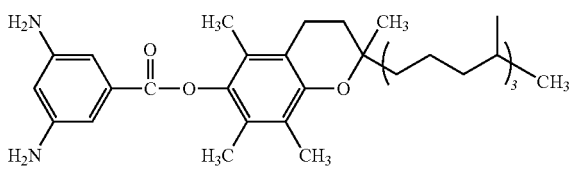

$B^4$ and $B^5$ represent a divalent aliphatic ring, a divalent aromatic ring, or a divalent heterocyclic ring group; and $B^6$ represents a $C_3$ to $C_{18}$ alkyl group, a $C_3$ to $C_{18}$ alkoxy group, a $C_1$ to $C_5$ fluoroalkyl group, a $C_1$ to $C_5$ fluoroalkoxy group, a cyano group, or a halogen atom.

The other diamines (b-3) represented by formula (III-2) are preferably diamine compounds represented by formula (III-2-1) to formula (III-2-13) below.

formula (III-2-1)

-continued formula (III-2-2)
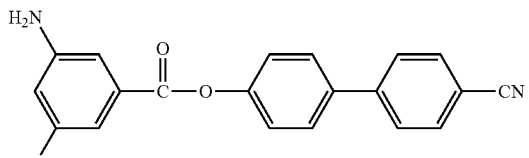

formula (III-2-3)
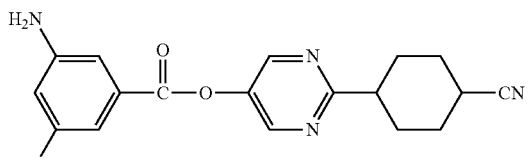

formula (III-2-4)
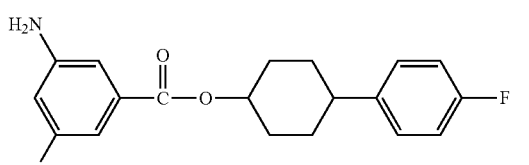

formula (III-2-5)
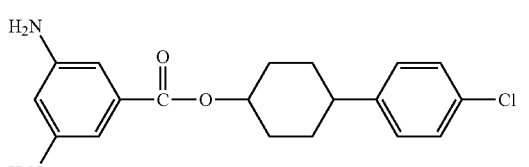

formula (III-2-6)
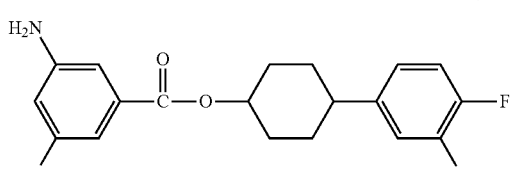

formula (III-2-7)
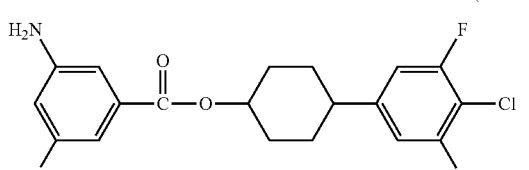

formula (III-2-8)
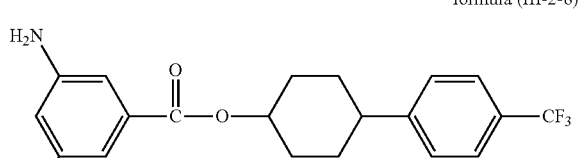

formula (III-2-9)
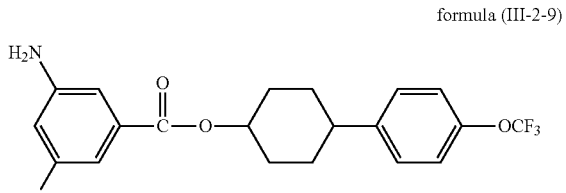

formula (III-2-10)
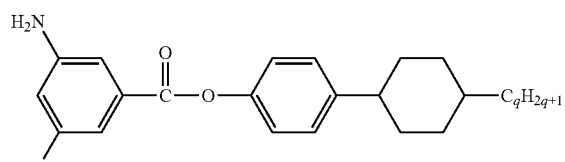

formula (III-2-11)
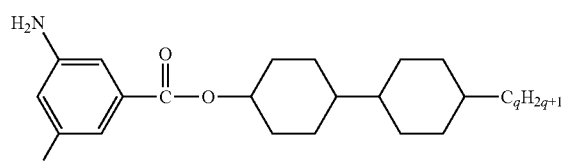

formula (III-2-12)
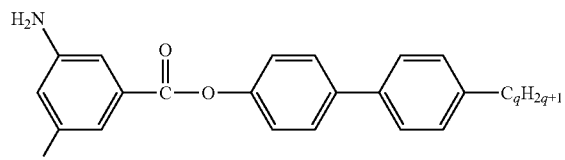

formula (III-2-13)
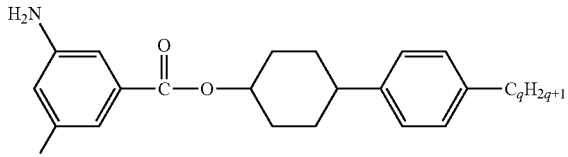

In formula (III-2-10) to formula (III-2-13), q represents an integer of 3 to 12.

formula (III-3)
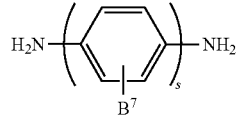

In formula (III-3), $B^7$ represents hydrogen, a $C_1$ to $C_5$ acyl group, a $C_1$ to $C_5$ alkyl group, a $C_1$ to $C_5$ alkoxy group, or halogen, and s in each repeating unit can be the same or different; and s is an integer of 1 to 3.

The diamine compound represented by formula (III-3) is preferably selected from (1) s is 1: for instance, p-diaminobenzene, m-diaminobenzene, o-diaminobenzene, or 2,5-diaminotoluene; (2) s is 2: for instance, 4,4'-diamino biphenyl, 2,2'-dimethyl-4,4'-diamino biphenyl, 3,3'-dimethyl-4,4'-diamino biphenyl, 3,3'-dimethoxy-4,4'-diamino biphenyl, 2,2'-dichloro-4,4'-diamino biphenyl, 3,3'-dichloro-4,4'-diamino biphenyl, 2,2',5,5'-tetrachloro-4,4'-diamino biphenyl, 2,2'-dichloro-4,4'-diamino-5,5'-dimethoxy biphenyl, or 4,4'-diamino-2,2'-bis(trifluoromethyl) biphenyl; (3) s is 3: for instance, 1,4-bis(4'-aminophenyl)benzene, and is preferably selected from p-diaminobenzene, 2,5-diaminotoluene, 4,4'-diamino biphenyl, 3,3'-dimethoxy-4,4'-diamino biphenyl, or 1,4-bis(4'-aminophenyl)benzene.

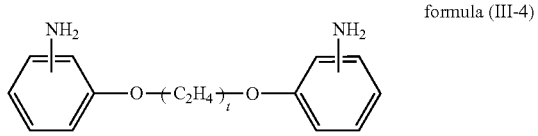
formula (III-4)

In formula (III-4), t represents an integer of 2 to 12.

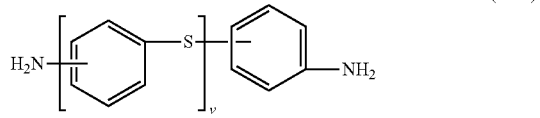
formula (III-5)

In formula (III-5), v represents an integer of 1 to 5. Formula (III-5) is preferably selected from 4,4'-diaminodiphenylsulfide.

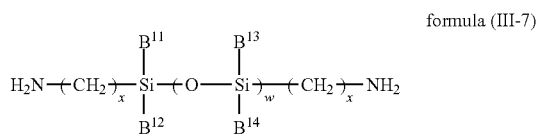
formula (III-6)

In formula (III-6), $B^8$ and $B^{10}$ can be the same or different and each independently represent a divalent organic group, and $B^9$ represents a divalent group containing a nitrogen atom ring structure derived from, for instance, pyridine, pyrimidine, triazine, piperidine, and piperazine.

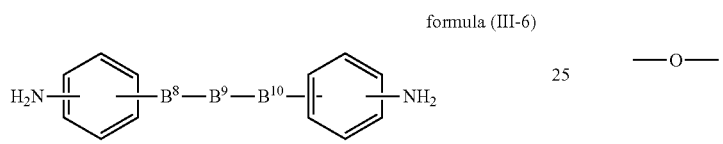
formula (III-7)

In formula (III-7), $B^{11}$, $B^{12}$, $B^{13}$, and $B^{14}$ are each the same or different, and can represent a $C_1$ to $C_{12}$ hydrocarbon group. w represents an integer of 1 to 3, and x represents an integer of 1 to 20.

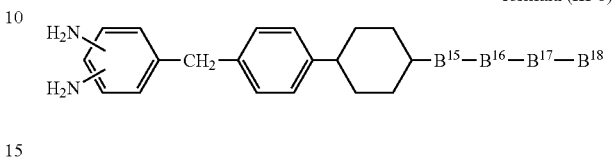
formula (III-8)

In formula (III-8), $B^{15}$ represents

—O— or a cyclohexylene group, $B^{16}$ represents a methylene group, $B^{17}$ represents a phenylene group or a cyclohexylene group, and $B^{18}$ represents hydrogen or a heptane group.

The diamine compound represented by formula (III-8) is preferably a diamine compound represented by formula (III-8-1) to formula (III-8-2) below.

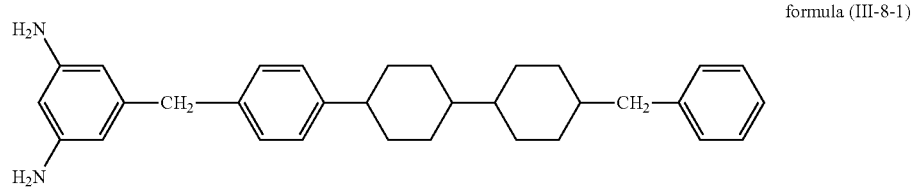
formula (III-8-1)

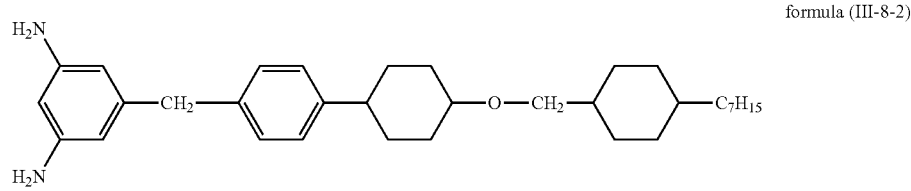
formula (III-8-2)

The other diamines (b-3) represented by formula (III-9) to formula (III-25) are as shown below.
formula (III-9)
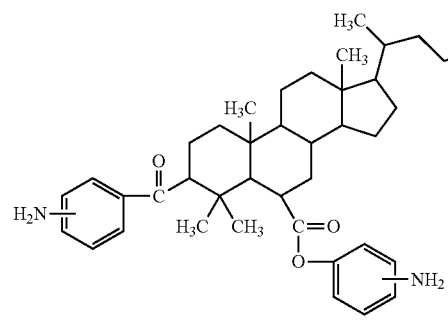
formula (III-10)
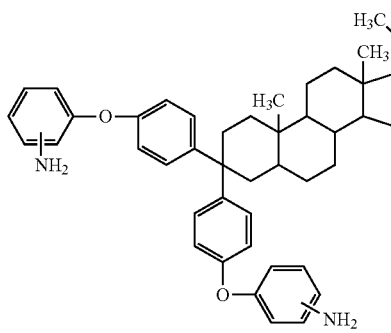
formula (III-11)
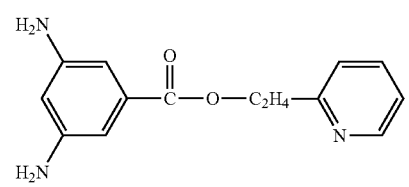
formula (III-12)
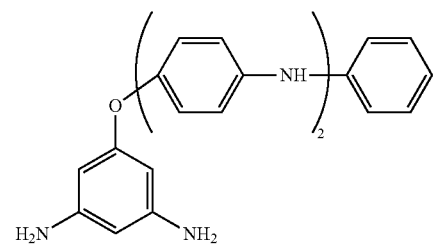
formula (III-13)
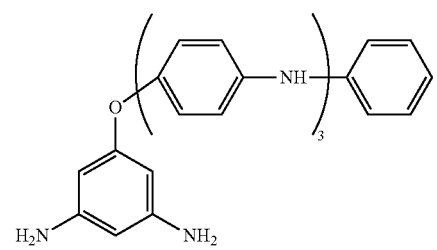
formula (III-14)
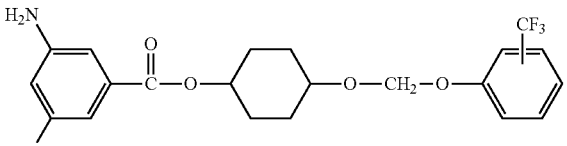
formula (III-15)
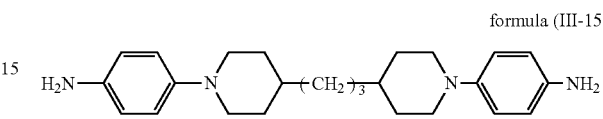
formula (III-16)
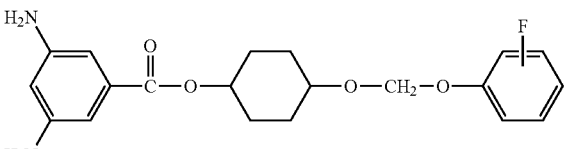
formula (III-17)
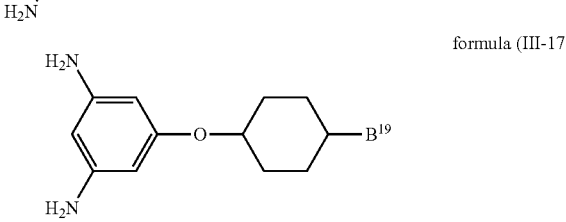
formula (III-18)
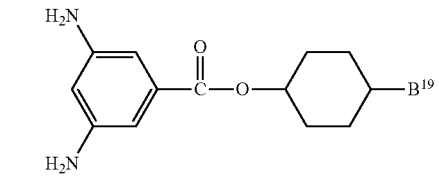
formula (III-19)
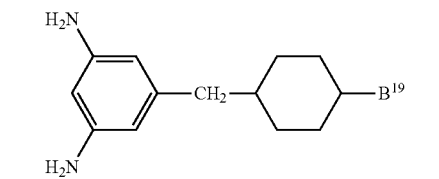
formula (III-20)
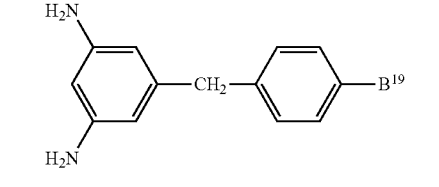
formula (III-21)

formula (III-22)

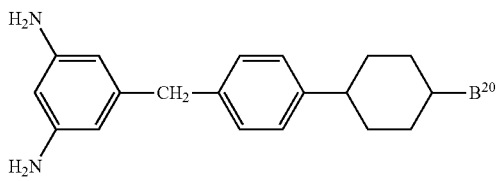

formula (III-23)

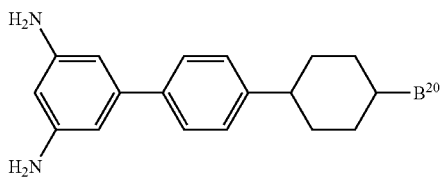

formula (III-24)

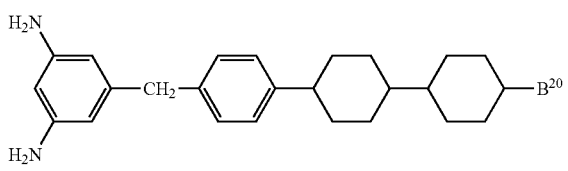

formula (III-25)

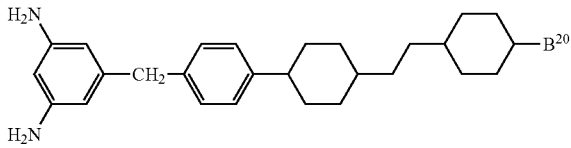

In formula (III-17) to formula (III-25), $B^{19}$ is a $C_1$ to $C_{10}$ alkyl group, preferably a $C_1$ to $C_{10}$ alkoxy group, and $B^{20}$ is preferably a hydrogen atom, a $C_1$ to $C_{10}$ alkyl group, or a $C_1$ to $C_{10}$ alkoxy group.

Specific examples of the other diamines (b-3) can further include a diamine compound having a chalcone structure such as 3,3'-diaminochalcone, 4,4'-diaminochalcone, 3,4'-diaminochalcone, or 3,4-diaminochalcone; a diamine compound having a stilbene structure such as 3,3'-diaminostilbene, 4,4'-diaminostilbene, 4,4'-diaminostilbene-2,2'-sulfonic acid, or 4,4'-bis(4-amino-1-naphthylazo)-2,2'-stilbene sulfonic acid; a diamine compound having anthraquinone such as 1,2-diamino anthraquinone, 1,4-diamino anthraquinone, 1,5-diamino anthraquinone, or 1,4-diamino anthraquinone-2,3-dicyano-9,10-anthraquinone; or a diamine compound having a carbazole structure such as 3,6-diaminocarbazole.

The other diamines (b-3) preferably include, but are not limited to, 1,2-diamino ethane, 4,4'-diamino dicyclohexyl methane, 4,4'-diamino diphenyl methane, 4,4'-diaminodiphenyl ether, 5-[4-(4-n-pentylcyclohexyl)cyclohexyl]phenylmethylene-1,3-diaminobenzene, 1,1-bis[4-(4-aminophenoxyl)phenyl]-4-(4-ethylphenyl)cyclohexane, 2,4-diaminophenyl ethyl formate, 2,2'-dimethyl-4,4'-diamino diphenyl, 4,4'-methylenebis(cyclohexylamine), 1,4-diaminocyclohexane, compounds represented by formula (III-1-1), formula (III-1-2), formula (III-2-1), formula (III-2-11), and formula (III-8-1), p-diaminobenzene, m-diaminobenzene, o-diaminobenzene, 3,3'-diaminochalcone, or 4,4'-diaminostilbene.

Based on a total number of moles of 100 moles of the diamine compound (b), the usage amount of the other diamines (b-3) is 0 to 89.5 moles, preferably 0 moles to 84 moles, and more preferably 0 moles to 78.5 moles.

Preparation Method of Polymer Composition (A-1)
Preparation Method of Polyamic Acid Polymer The preparation method of the polyamic acid polymer includes first dissolving a mixture in a solvent, wherein the mixture includes a tetracarboxylic acid dianhydride compound (a) and a diamine compound (b). A polycondensation reaction is then performed at a temperature of 0° C. to 100° C. After reacting for 1 hour to 24 hours, the reaction solution is distilled under reduced pressure by using an evaporator to obtain the polyamic acid polymer. Alternatively, the reaction solution is poured into a large amount of a poor solvent to obtain a precipitate. Then, the precipitate is dried with a method of drying under reduced pressure to obtain the polyamic acid polymer.

In particular, based on a total usage amount of 100 moles of the diamine compound (b), the usage amount of the tetracarboxylic acid dianhydride compound (a) is preferably 20 moles to 200 moles, more preferably 30 moles to 120 moles.

The solvent used in the polycondensation reaction can be the same or different as the solvent in the liquid crystal alignment agent below, and the solvent used in the polycondensation reaction is not particularly limited, provided the solvent can dissolve the reactants and the products. Preferably, the solvent includes, but is not limited to (1) an aprotic polar solvent such as N-methyl-2-pyrrolidinone (NMP), N,N-dimethyl acetamide, N,N-dimethyl formamide, dimethyl sulfoxide, γ-butyrolactone, tetramethylurea, or hexamethylphosphor amide; or (2) a phenol solvent such as m-cresol, xylenol, phenol, or halogenated phenol. Based on a total usage amount of 100 parts by weight of the mixture, the usage amount of the solvent used in the polycondensation reaction is preferably 200 parts by weight to 2000 parts by weight, more preferably 300 parts by weight to 1800 parts by weight.

In particular, in the polycondensation reaction, the solvent can be used with a suitable amount of a poor solvent, wherein the poor solvent does not cause precipitation of the polyamic acid polymer. The poor solvent can be used alone or in multiple combinations, and includes, but is not limited to, (1) an alcohol such as methanol, ethanol, isopropanol, cyclohexanol, ethylene glycol, propylene glycol, 1,4-butanediol, or triglycol; (2) a ketone such as acetone, methyl ethyl ketone, methyl isobutyl ketone, or cyclohexanone; (3) an ester such as methyl acetate, ethyl acetate, butyl acetate, diethyl oxalate, diethyl malonate, or ethylene glycol monoethyl ether acetate; (4) an ether such as diethyl ether, ethylene glycol monomethyl ether, ethylene glycol monoethyl ether, ethylene glycol-n-propyl ether, ethylene glycol isopropyl ether, ethylene glycol n-butyl ether, ethylene glycol dimethyl ether, or diethylene glycol dimethyl ether; (5) a halogenated hydrocarbon such as dichloromethane, 1,2-dichloroethane, 1,4-dichlorobutane, trichloroethane, chlorobenzene, or o-dichlorobenzene; or (6) a hydrocarbon such as tetrahydrofuran, hexane, heptane, octane, benzene, toluene, or xylene, or any combination of the solvents above. Based on a usage amount of 100 parts by weight of the diamine compound (b), the usage amount of the poor solvent is preferably 0 parts by weight to 60 parts by weight, more preferably 0 parts by weight to 50 parts by weight.

Polyimide Polymer

The preparation method of the polyimide polymer includes first dissolving a mixture in a solution, wherein the mixture includes the tetracarboxylic acid dianhydride compound (a) and the diamine compound (b). A polymerization reaction is then performed to form a polyamic acid polymer.

Then, under the existence of a dehydrating agent and a catalyst, the mixture is further heated and a cyclodehydration reaction is performed such that an amic acid functional group in the polyamic acid polymer can be converted into an imide functional group (i.e., imidization) through the cyclodehydration reaction to obtain the polyimide polymer.

The solvent used in the cyclodehydration reaction can be the same as the solvent in the liquid crystal alignment agent below and is therefore not repeated herein. Based on a usage amount of 100 parts by weight of the polyamic acid polymer, the usage amount of the solvent used in the cyclodehydration reaction is preferably 200 parts by weight to 2000 parts by weight, more preferably 300 parts by weight to 1800 parts by weight.

To obtain a preferable degree of imidization of the polyamic acid polymer, the operating temperature of the cyclodehydration reaction is preferably 40° C. to 200° C., more preferably 40° C. to 150° C. If the operating temperature of the cyclodehydration reaction is less than 40° C., then the imidization reaction is incomplete, and the degree of imidization of the polyamic acid polymer is thereby reduced. However, if the operating temperature of the cyclodehydration reaction is higher than 200° C., then the weight-average molecular weight of the obtained polyimide polymer is lower.

The imidization rate of the polymer composition (A-1) is generally 30% or less, preferably 20% or less, more preferably 10% or less.

The dehydrating agent used in the cyclodehydration reaction can be selected from an anhydride compound, and specific examples thereof include, for instance, acetic anhydride, propionic anhydride, or trifluoroacetic anhydride. Based on 1 mole of the polyamic acid polymer, the usage amount of the dehydrating agent is 0.01 moles to 20 moles. The catalyst used in the cyclodehydration reaction can be selected from (1) a pyridine compound such as pyridine, trimethyl pyridine, or dimethyl pyridine; and (2) a tertiary amine compound such as triethylamine. Based on 1 mole of the dehydrating agent, the usage amount of the catalyst is 0.5 moles to 10 moles.

Polyimide-Based Block Copolymer

The polyimide-based block copolymer is selected from a polyamic acid block copolymer, a polyimide block copolymer, a polyamic acid-polyimide block copolymer, or any combination of the polymers.

Preferably, the preparation method of the polyimide-based block copolymer includes first dissolving a starting material in a solvent and then performing a polycondensation reaction, wherein the starting material includes at least one type of polyamic acid polymer and/or at least one type of polyimide polymer above, and can further include the tetracarboxylic acid dianhydride compound (a) and the diamine compound (b).

The tetracarboxylic acid dianhydride compound (a) and the diamine compound (b) in the starting material are the same as the tetracarboxylic acid dianhydride compound (a) and the diamine compound (b) used in the preparation of the polyamic acid polymer. Moreover, the solvent used in the polycondensation reaction can be the same as the solvent in the liquid crystal alignment agent below and is not repeated herein.

Based on a usage amount of 100 parts by weight of the starting material, the usage amount of the solvent used in the polycondensation reaction is preferably 200 parts by weight to 2000 parts by weight, more preferably 300 parts by weight to 1800 parts by weight. The operating temperature of the polycondensation reaction is preferably 0° C. to 200° C., more preferably 0° C. to 100° C.

Preferably, the starting material includes, but is not limited to (1) two polyamic acid polymers in which the terminal groups are different and the structures are different; (2) two polyimide polymers in which the terminal groups are different and the structures are different; (3) a polyamic acid polymer and a polyimide polymer in which the terminal groups are different and the structures are different; (4) a polyamic acid polymer, a tetracarboxylic acid dianhydride compound, and a diamine compound, wherein the structure of at least one of the tetracarboxylic acid dianhydride compound and the diamine compound is different from the structures of the tetracarboxylic acid dianhydride compound and the diamine compound used to form the polyamic acid polymer; (5) a polyimide polymer, a tetracarboxylic acid dianhydride compound, and a diamine compound, wherein the structure of at least one of the tetracarboxylic acid dianhydride compound and the diamine compound is different from the structures of the tetracarboxylic acid dianhydride compound and the diamine compound used to form the polyimide polymer; (6) a polyamic acid polymer, polyimide polymer, a tetracarboxylic acid dianhydride compound, and a diamine compound, wherein the structure of at least one of the tetracarboxylic acid dianhydride compound and the diamine compound is different from the structures of the tetracarboxylic acid dianhydride compound and the diamine compound used to form the polyamic acid polymer or the polyimide polymer; (7) two polyamic acid polymers having different structures, a tetracarboxylic acid dianhydride compound, and a diamine compound; (8) two polyimide polymers having different structures, a tetracarboxylic acid dianhydride compound, and a diamine compound; (9) two polyamic acid polymers having acid anhydride groups as terminal groups and having different structures, and a diamine compound; (10) two polyamic acid polymers having amine groups as terminal groups and having different structures, and a tetracarboxylic acid dianhydride compound; (11) two polyimide polymers having acid anhydride groups as terminal groups and having different structures, and a diamine compound; or (12) two polyimide polymers having amine groups as terminal groups and having different structures, and a tetracarboxylic acid dianhydride compound.

Without affecting the efficacy of the invention, preferably, the polyamic acid polymer, the polyimide polymer, and the polyimide-based block copolymer can be terminal modified polymers in which molecular weight regulation is first performed. By using the terminal modified polymers, the coating performance of the liquid crystal alignment agent can be improved. The preparation method of the terminal modified polymers can include adding a monofunctional compound at the same time a polycondensation reaction is performed on a polyamic acid polymer. The monofunctional compound includes, but is not limited to, (1) a monoanhydride such as maleic anhydride, phthalic anhydride, itaconic anhydride, n-decyl succinic anhydride, n-dodecyl succinic anhydride, n-tetradecyl succinic anhydride, or n-hexadecyl succinic anhydride; (2) a monoamine compound such as aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, or n-eicosylamine; or (3) a monoisocyanate compound such as phenyl isocyanate or naphthyl isocyanate.

Solvent (B)

Specific examples of the solvent (B) include N-methyl-2-pyrrolidone (NMP), γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, N,N-dimethyl formamide, N,N-dimethyl acetamide, or any combination of the solvents above. The solvent (B) is preferably NMP, ethylene glycol n-butyl ether, N,N-dimethyl acetamide, or a combination of the solvents. The solvent (B) can be used alone or in multiple combinations.

Additive (C)

Without affecting the efficacy of the invention, an additive (C) can also optionally be added to the liquid crystal alignment agent, wherein the additive (C) is an epoxy compound or a silane compound having a functional group. The function of the additive (C) is to improve the adhesion of the liquid crystal alignment film to the substrate surface. The additive (C) can be used alone or in multiple combinations.

The epoxy compound includes, but is not limited to, for instance, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromoneopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl) cyclohexane, N,N,N',N'-tetraglycidyl-4,4'-diaminodiphenyl methane, N,N-diglycidyl-p-glycidyloxy aniline, 3-(N-allyl-N-glycidyl)aminopropyltrimethoxysilane, or 3-(N,N-diglycidyl)aminopropyltrimethoxysilane.

Based on a usage amount of 100 parts by weight of the polymer composition (A-1), the usage amount of the epoxy compound is generally 40 parts by weight or less, preferably 0.1 parts by weight to 30 parts by weight.

The silane compound having a functional group includes, but is not limited to, for instance, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, or N-bis(oxyethylene)-3-aminopropyltriethoxysilane.

Based on a usage amount of 100 parts by weight of the polymer composition (A-1), the usage amount of the silane compound is generally 10 parts by weight or less, preferably 0.5 parts by weight to 10 parts by weight.

<Preparation Method of Liquid Crystal Alignment Agent>

The preparation method of the liquid crystal alignment agent of the invention is not particularly limited, and a general mixing method can be used for the preparation. For instance, the tetracarboxylic acid dianhydride compound (a) and the diamine compound (b) are first uniformly mixed to form the polymer composition (A-1). Then, the polymer composition (A-1) is added to the solvent (B) under a temperature condition of 0° C. to 200° C. Next, the additive (C) can be optionally added, and the mixture is continuously stirred with a stirring apparatus until dissolved. Preferably, the solvent (B) is added to the polymer composition at a temperature of 20° C. to 60° C.

Preferably, at 25° C., the viscosity of the liquid crystal alignment agent of the invention is generally 15 cps to 35 cps, preferably 17 cps to 33 cps, more preferably 20 cps to 30 cps.

<Preparation Method of Liquid Crystal Alignment Film>

The liquid crystal alignment agent of the invention is suitable for forming a liquid crystal alignment film through a photoalignment method.

The forming method of the liquid crystal alignment film can include, for instance, coating the liquid crystal alignment agent on a substrate to form a coating film, and irradiating the coating film with polarized or unpolarized ultraviolet from a direction inclined relative to the coating film surface to provide liquid crystal alignment to the coating film. Alternately, the coating film is irradiated with polarized ultraviolet from a direction perpendicular to the coating film surface to provide liquid crystal alignment to the coating film.

First, the liquid crystal alignment agent of the invention is coated on one side of a transparent conductive film of a substrate on which a patterned transparent conductive film is disposed through a suitable coating method such as a roll coating method, a spin coating method, a printing method, or an ink-jet method. After coating, a pre-bake treatment is performed on the coating surface, and then a post-bake treatment is performed to form a coating film. The purpose of the pre-bake treatment is to volatilize the organic solvent in the pre-coating layer. The pre-bake treatment is, for instance, performed under the conditions of 0.1 to 5 minutes at 40 to 120° C. The post-bake treatment is preferably performed under the condition of 120 to 300° C., more preferably 150 to 250° C., and is preferably performed for 5 to 200 minutes, more preferably 10 to 100 minutes. The film thickness of the coating film after post-bake is preferably 0.001 to μm, more preferably 0.005 to 0.5 μm.

The substrate can include, for instance, a glass such as a float glass or a soda-lime glass; or a transparent substrate formed by, for instance, a plastic such as poly(ethylene terephthalate), poly(butylene terephthalate), polyethersulfone, or polycarbonate.

The transparent conductive film can include, for instance, a NESA film formed by $SnO_2$ or an ITO (indium tin oxide) film formed by $In_2O_3$—$SnO_2$. To form the transparent conductive film patterns, a method such as photo-etching or a method in which a mask is used when the transparent conductive film is formed can be used.

When the liquid crystal alignment agent is coated, to improve the adhesion between the substrate or transparent conductive film and the coating film, a functional silane compound or a titanate compound . . . etc. can be pre-coated on the substrate and the transparent conductive film.

Then, liquid crystal alignment is provided by irradiating the coating film with polarized or unpolarized ultraviolet, and the liquid crystal alignment film is formed by the coating film. Here, the radiation can include, for instance, ultraviolet and visible light having a wavelength of 150-800 nm, and preferably includes ultraviolet having a wavelength of 300-400 nm. When the radiation used is polarized light (linearly polarized light or partially polarized light), irradiation can be performed from a direction perpendicular to the coating film surface. Moreover, to provide a pretilt angle, irradiation can also be performed from an inclined angle. Moreover, when unpolarized radiation is irradiated, irradiation needs to be performed from the direction inclined relative to the coating film surface.

The light source of the radiation exposure can include, for instance, a low-pressure mercury lamp, a high-pressure mercury lamp, a deuterium lamp, a metal halide lamp, an argon resonance lamp, a xenon lamp, or an excimer laser. The ultraviolet in the preferred wavelength region can be obtained by, for instance, using the light sources above with, for instance, a filter or a diffraction grating.

The radiation exposure is preferably equal to or greater than 1 J/m2 and equal to or less than 10000 J/m2, more preferably 10-3000 J/m2. Moreover, when liquid crystal alignment is provided to a coating film formed by a conventionally known liquid crystal alignment agent through a photoalignment method, a radiation exposure equal to or greater than 10000 J/m2 is needed. However, if the liquid crystal alignment agent of the invention is used, then even if the radiation exposure in the photoalignment method is equal to or less than 3000 J/m2, further equal to or less than 1000 J/m2, and further equal to or less than 300 J/m2, good photoalignment can still be achieved. As a result, the manufacturing costs of the liquid crystal display device can be reduced.

<Fabrication Method of Liquid Crystal Display Device>

The liquid crystal display device of the invention includes the liquid crystal alignment film formed by the liquid crystal alignment agent of the invention. The liquid crystal display device of the invention can be made according to the following method.

Two substrates on which a liquid crystal alignment film is formed are prepared, and liquid crystals are disposed between the two substrates to make a liquid crystal cell. To make the liquid crystal cell, the following two methods can be provided.

The first method includes first disposing the two substrates opposite to each other with a gap (cell gap) in between such that each liquid crystal alignment film is opposite to one another. Then, the peripherals of the two substrates are bonded together with a sealant. Next, liquid crystals are injected into the cell gap divided by the substrate surfaces and the sealant, and then the injection hole is sealed to obtain the liquid crystal cell.

The second method is called ODF (one drop fill, instillation). First, an ultraviolet curable sealing material for instance is coated on a predetermined portion of one of the two substrates forming the liquid crystal alignment films. Then, liquid crystals are dropped onto the liquid crystal alignment film, and then the other substrate is bonded such that the liquid crystal alignment films are opposite to each other. Next, ultraviolet is irradiated on the entire substrate surface such that the sealant is cured. The liquid crystal cell can thus be made.

When any one of the above methods is used, preferably, after the liquid crystal cell is next heated to a temperature at which the liquid crystals used are in an isotropic phase, the liquid crystal cell is slowly cooled to room temperature to remove flow alignment when the liquid crystals are filled.

Next, by bonding a polarizing plate on the outer surface of the liquid crystal cell, the liquid crystal display device of the invention can be obtained. Here, when the liquid crystal alignment films are parallelly aligned, a liquid crystal display device having a TN-type or STN-type liquid crystal cell can be obtained by adjusting the angle formed by the polarization direction of the linearly polarized radiation irradiated in the two substrates forming the liquid crystal alignment films and the angle of each substrate and polarizing plate. Moreover, when the liquid crystal alignment films are perpendicularly aligned, by forming the liquid crystal cell, the directions of the easy-to-align axis of the two substrates forming the liquid crystal alignment films are parallel, and then the polarizing plate and the liquid crystal cell are stuck together such that the polarization direction thereof and the easy-to-align axis form a 45° angle. As a result, a liquid crystal display device having a vertical alignment-type liquid crystal cell can be formed.

Specific examples of the sealant include, for instance, an epoxy resin used as a curing agent and an alumina balls used as a spacer.

Specific examples of the liquid crystals include, for instance, nematic liquid crystals or smectic liquid crystals.

When a TN-type or STN-type liquid crystal cell is used, the TN-type or STN-type liquid crystal cell preferably has nematic liquid crystals having positive dielectric anisotropy, and examples thereof can include, for instance, biphenyl-based liquid crystals, phenyl cyclohexane-based liquid crystals, ester-based liquid crystals, terphenyl liquid crystals, biphenyl cyclohexane-based liquid crystals, pyrimidine-based liquid crystals, dioxane-based liquid crystals, bicyclooctane-based liquid crystals, or cubane-based liquid crystals. Moreover, the following can further be added to the liquid crystals above: cholesteric liquid crystals such as cholesteryl chloride, cholesteryl nonabenzoate, or cholesteryl carbonate; chiral agents sold under the product names of, for instance, "C-15" or "CB-15" (made by Merck & Co.); or ferroelectric liquid crystals such as p-decyloxybenzylidene-p-amino-2-methyl butyl cinnamate.

Moreover, when a vertical alignment-type liquid crystal cell is used, the vertical alignment-type liquid crystal cell preferably has nematic liquid crystals having negative dielectric anisotropy, and examples thereof can include, for instance, dicyanobenzene-based liquid crystals, pyridazine-based liquid crystals, Schiff base-based liquid crystals, azoxy-based liquid crystals, biphenyl-based liquid crystals, or phenyl cyclohexane-based liquid crystals.

The polarizing plate used on the outside of the liquid crystal cell can include, for instance, a polarizing plate formed by a polarizing film known as "H film" obtained when iodine is absorbed at the same time that polyvinyl alcohol is stretch aligned by clamping with a cellulose acetate protective film, or a polarizing plate formed by the "H film" itself.

The liquid crystal display device of the invention thus made has excellent display performance, and even after prolonged use, the display performance is not worsened.

FIG. 1 is a side view of a liquid crystal display device according to an embodiment of the invention. A liquid crystal display device 100 includes a first unit 110, a second unit 120, and a liquid crystal unit 130, wherein the second unit 120 and the first unit 110 are separately disposed and the liquid crystal unit 130 is disposed between the first unit 110 and the second unit 120.

The first unit 110 includes a first substrate 112, a first conductive film 114, and a first liquid crystal alignment film 116, wherein the first conductive film 114 is located between the first substrate 112 and the first liquid crystal alignment film 116, and the first liquid crystal alignment film 116 is located on one side of the liquid crystal unit 130.

The second unit 120 includes a second substrate 122, a second conductive film 124, and a second liquid crystal alignment film 126, wherein the second conductive film 124 is located between the second substrate 122 and the second liquid crystal alignment film 126, and the second liquid crystal alignment film 126 is located on another side of the liquid crystal unit 130. In other words, the liquid crystal unit 130 is located between the first liquid crystal alignment film 116 and the second liquid crystal alignment film 126.

The first substrate 112 and the second substrate 122 are selected from, for instance, a transparent material, wherein the transparent material includes, but is not limited to, for instance, alkali-free glass, soda-lime glass, hard glass (Pyrex glass), quartz glass, polyethylene terephthalate, polybutylene terephthalate, polyethersulfone, or polycarbonate. The material of each of the first conductive film 114 and the second conductive film 124 is selected from, for instance, tin oxide (SnO2) or indium oxide-tin oxide (In2O3-SnO2).

The first liquid crystal alignment film 116 and the second liquid crystal alignment film 126 are respectively the liquid crystal alignment films above, and the function of each thereof is to make the liquid crystal unit 130 form a pretilt angle. Moreover, when a voltage is applied to the first conductive film 114 and the second conductive film 124, an electric field can be generated between the first conductive film 114 and the second conductive film 124. The electric field can drive the liquid crystal unit 130, thereby causing change to the arrangement of the liquid crystal molecules in the liquid crystal unit 130.

Preparation Examples of Diamine (b-1)

Preparation example 1 to preparation example 4 of the diamine (b-1) represented by formula (I) are described below.

Preparation Example 1

The compound represented by formula (b-1-1) (referred to as "compound (b-1-1)" hereinafter, same as formula (I-10)) was synthesized according to the following synthesis scheme 1.

Synthesis scheme 1

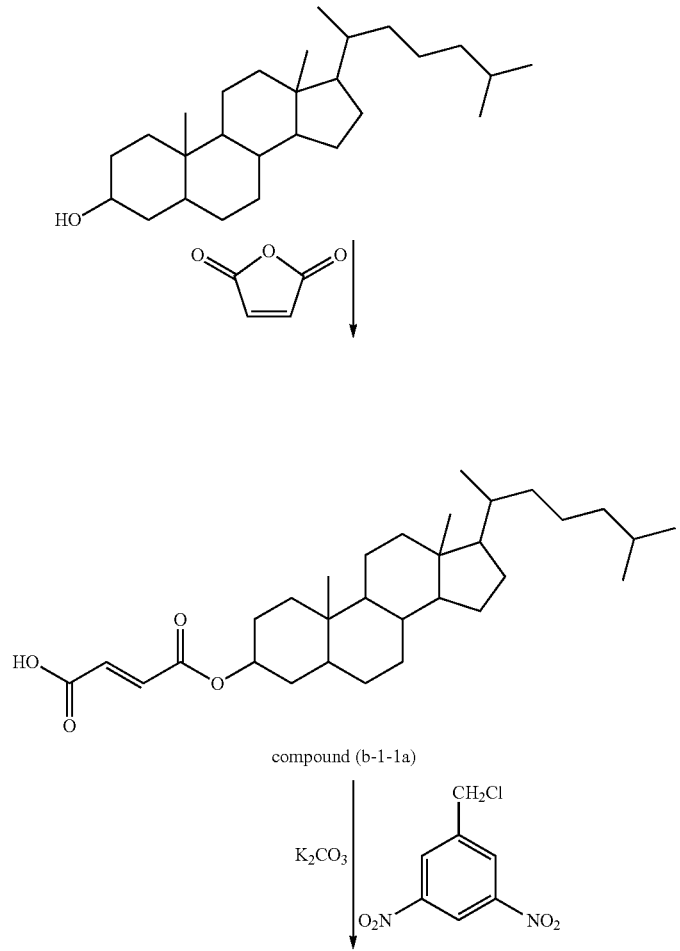

compound (b-1-1a)

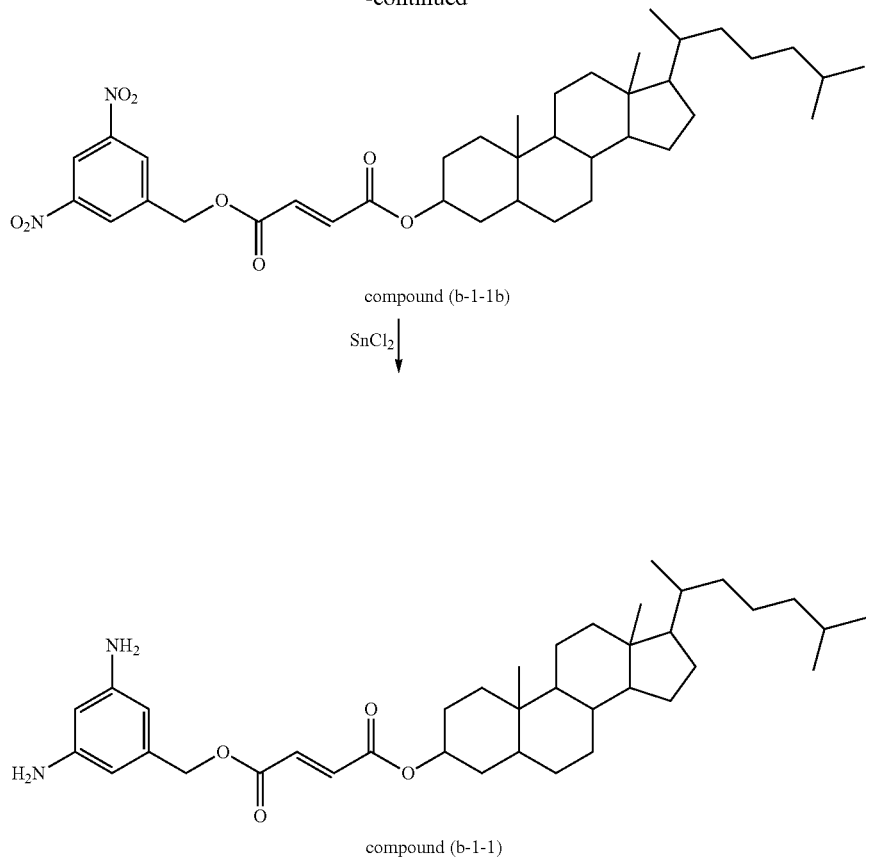

compound (b-1-1b)

compound (b-1-1)

(1) Synthesis of Compound (b-1-1a)

In a 5 L three-neck flask provided with a stirrer, a nitrogen gas inlet tube, and a thermometer, 389 g of β-cholestanol, 201 g of maleic anhydride, 15 g of N,N-dimethylaminopyridine, 170 ml of triethylamine, and 2 L of ethyl acetate were added. Then, the mixture was reacted at 90° C. for 8 hours. After the reaction was complete, distillation was performed under reduced pressure to remove ethyl acetate. Next, 2 L of chloroform was added, and the organic layer was successively washed with dilute hydrochloric acid 3 times and then washed with water 4 times. Then, the organic layer was dried and concentrated with magnesium sulfate. Next, the resulting precipitate was filtered off to remove the solvent so as to obtain 223 g of white powder of a compound (b-1-1a). Moreover, the synthesis of the compound (b-1-1a) can be repeated in the above scale according to need so as to ensure the required amount of each example below.

(2) Synthesis of Compound (b-1-1b)

In a 5 L three-neck flask provided with a stirrer, a thermometer, and a nitrogen gas inlet tube, 223 g of the compound (b-1-1a) synthesized above, 108 g of 3,5-dinitrobenzoyl chloride, 207 g of potassium carbonate, 150 g of sodium iodide, and 1500 ml of N,N-dimethyl formamide were added. Then, the mixture was reacted at 60° C. for 8 hours. After the reaction was complete, 3 L of chloroform was added and the obtained organic layer was washed with water 3 times. Next, the organic layer was dried with magnesium sulfate. The organic layer was concentrated and the precipitated solid was recovered. The solid was then washed with ethanol to obtain 280 g of light yellow powder of a compound (b-1-1b).

(3) Synthesis of Compound (b-1-1)

In a 5 L three-neck flask provided with a stirrer, a thermometer, and a nitrogen gas inlet tube, 200 g of the compound (b-1-1b) synthesized above, 680 g of tin(II) chloride dihydrate ($SnCl_2 \cdot 2H_2O$), and 2 L of ethyl acetate were added. Then, the mixture was reacted for 4 hours under reflux. After the reaction was complete, the reaction mixture was successively washed with an aqueous solution of potassium fluoride and water. After the organic layer was dried and concentrated with magnesium sulfate, the organic layer was recrystallized with ethanol to obtain 58 g of light yellow crystals of a compound (b-1-1).

Preparation Example 2

The compound represented by formula (b-1-2) (referred to as "compound (b-1-2)" hereinafter, same as formula (I-11)) was synthesized according to the following synthesis scheme 2.

Synthesis scheme 2
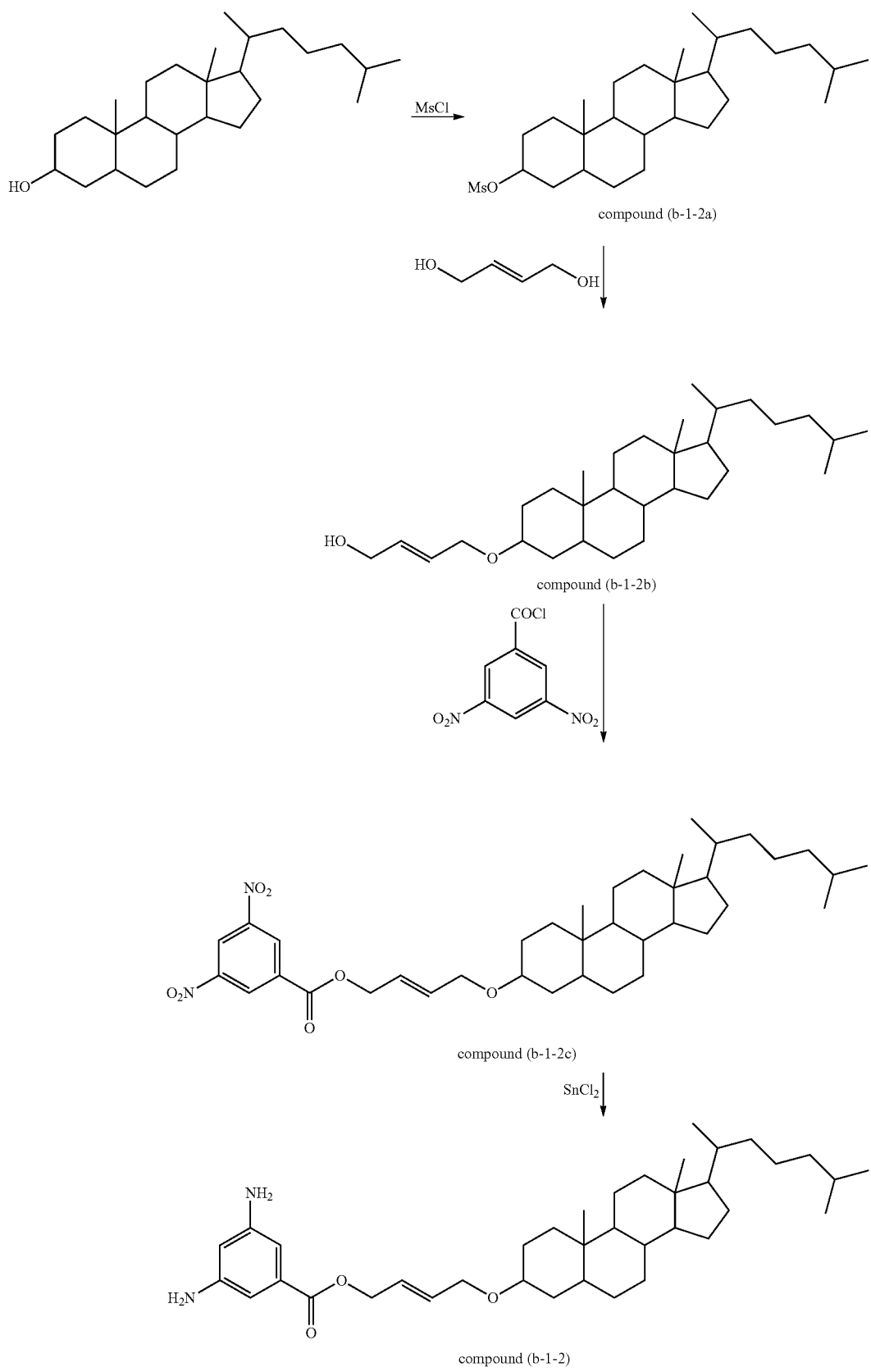

(1) Synthesis of Compound (b-1-2a)

In a 1 L three-neck flask provided with a dropping funnel, a thermometer, and a nitrogen gas inlet tube, 117 g of β-cholestanol, 3.7 g of N,N-dimethylaminopyridine, 400 ml of tetrahydrofuran, and 55 ml of triethylamine were added. Then, the mixture was cooled with ice. At this point, a solution composed of 31 ml of methanesulfonyl chloride (MsCl) and 100 ml of tetrahydrofuran was added to the mixture dropwise via the dropping funnel over 1 hour. Next, the mixture was stirred at room temperature for 3 hours to react. After the reaction was complete, 500 ml of ethyl acetate was added to the reaction mixture, and after the obtained organic layer was washed with water 3 times via a separatory funnel, the reaction mixture was dried with magnesium sulfate. Then, after the organic layer was concentrated to about 300 ml, the organic layer was spread into 600 ml of ethanol. The resulting white precipitate was collected by filtration and dried to obtain 117 g of compound (b-1-2a). In formula (b-1-2a), Ms represents methylsulfonyl ($CH_3SO_2$—).

(2) Synthesis of Compound (b-1-2b)

46.7 g of the obtained compound (b-1-2a), 220 g of 2-butene-1,4-diol, and 200 ml of 1,4-dioxane were mixed and then reacted by heating and stirring at 100° C. for 20 hours. After the reaction was complete, 500 ml of water and 500 ml of chloroform were added to the reaction mixture. The reaction mixture was then thoroughly stirred. Next, the organic layer was separated and then successively washed once with 500 ml of a saturated aqueous solution of sodium bicarbonate and washed twice with 500 ml of water. The organic layer was dehydrated with magnesium sulfate, and after the organic layer was filtered and concentrated, 500 ml of ethanol was added. After stirring at 0° C., the organic layer was left overnight. After the white precipitate resulting from being left overnight was filtered out, the filtrate was concentrated and the solvent was removed to obtain 29.1 g of a viscous fluid crude product of a compound (b-1-2b).

(3) Synthesis of Compound (b-1-2c)

29.1 g of the obtained compound (b-1-2b) and 14.0 g of 3,5-dinitrobenzoyl chloride were mixed and then stirred in 300 ml of a tetrahydrofuran solvent at 0° C. for 10 minutes. After 8.4 ml of triethylamine was added dropwise to the mixture over 10 minutes, the mixture was stirred at room temperature for 3 hours to react. After the reaction was complete, the reaction solution was concentrated, and after 500 ml of chloroform was added, the reaction solution was washed with 300 ml of water 4 times. After the organic layer was dehydrated with magnesium sulfate and the organic layer was filtered and concentrated, the viscous fluid was recovered. The viscous fluid was refined by column chromatography using a silicon column (elution solvent: chloroform) to obtain 20.8 g of a light yellow oily compound (b-1-2c).

(4) Synthesis of Compound (b-1-2)

In a nitrogen atmosphere, 20.8 g of the obtained compound (b-1-2c) and 78 g of the tin(II) chloride dihydrate were mixed and then heated and stirred in 350 ml of an ethyl acetate solvent under reflux for 4 hours. Then, 400 ml 2 mol/L of an aqueous solution of potassium fluoride was added, and then the mixture was stirred and the precipitated salt was filtered out. The organic layer was washed once with 400 ml 2 mol/L of potassium fluoride and washed 3 times with 400 ml of water, and after the organic layer was dehydrated with magnesium sulfate, the organic layer was filtered and concentrated to obtain a light yellow powder. The obtained powder was refined by column chromatography (elution solvent: chloroform/ethanol=95/5 (volume ratio)) to obtain 14.5 g of white powder of a compound (b-1-2).

Preparation Example 3

The compound represented by formula (b-1-3) (referred to as "compound (b-1-3)" hereinafter, same as formula (I-19)) was synthesized according to the following synthesis scheme 3.

Synthesis scheme 3

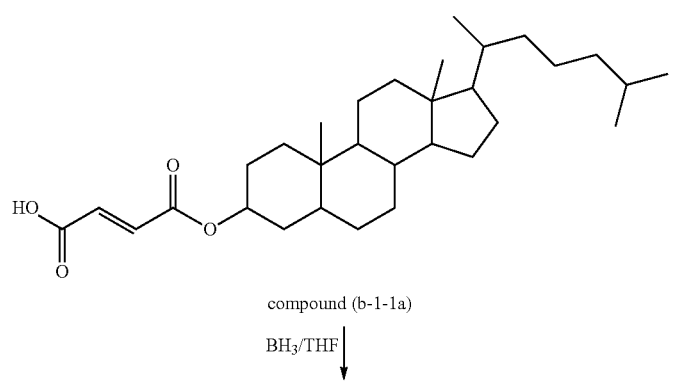

compound (b-1-1a)

$BH_3$/THF

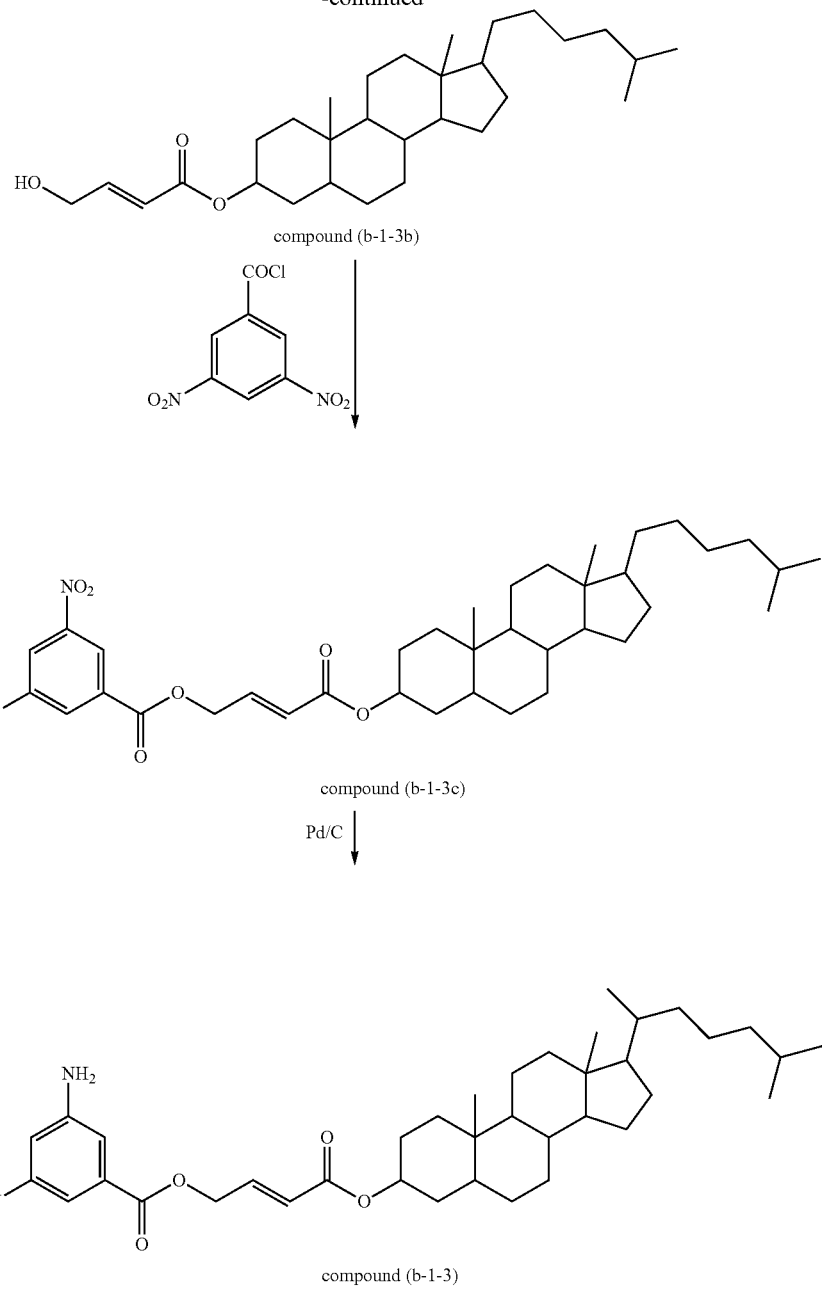

compound (b-1-3b)

compound (b-1-3c)

compound (b-1-3)

(1) Synthesis of Compound (b-1-3b)

In a 500 ml three-neck flask provided with a dropping funnel, a nitrogen gas inlet tube, and a thermometer, 24 g of the compound (b-1-1a) and 150 ml of tetrahydrofuran were added, and then the mixture was cooled to −18° C. After 55 ml of borane-tetrahydrofuran complex/tetrahydrofuran solution ($BH_3$/THF) having a concentration of 0.9 mol/L was added dropwise to the mixture over 30 minutes, the mixture was further reacted at room temperature for 16 hours. After the reaction was complete, the reaction mixture was cooled with ice. Then, after 30 ml of water was slowly added thereto, ethyl acetate was added, and after the obtained organic layer was successively washed with an aqueous solution of saturated sodium bicarbonate twice using a separatory funnel and washed with water 3 times using a separatory funnel, the organic layer was dried with magnesium sulfate and then concentrated and dried to obtain 17 g of white powder of a compound (b-1-3b).

(2) Synthesis of Compound (b-1-3c)

In a 500 ml three-neck flask provided with a dropping funnel, a nitrogen gas inlet tube, and a thermometer, 15 g of the obtained compound (b-1-3b), 4.5 ml of triethylamine, and 100 ml of tetrahydrofuran were added, and then the mixture was cooled with ice. At this point, 7.4 g of 3,5-dinitrobenzoyl chloride dissolved in 50 ml of tetrahydrofuran was added dropwise over 1 hour by using the dropping funnel, and then the mixture was reacted at room temperature for 2 hours. After the reaction was complete, ethyl acetate was added to the reaction mixture, and after the obtained organic layer was successively washed twice with an aqueous solution of sodium bicarbonate using a separatory funnel and washed 3 times with water, the organic layer was dried with magnesium sulfate. After the organic layer was concentrated and dried, recrystallization was performed in ethanol to obtain 10 g of a compound (b-1-3c).

(3) Synthesis of Compound (b-1-3)

In a 1 L three-neck flask provided with a return tube, a nitrogen gas inlet tube, and a thermometer, 10 g of the obtained compound (b-1-3c) above, 95 mg of 5 weight % palladium carbon powder (Pd/C), 120 ml of ethanol, 60 ml of tetrahydrofuran, and 3.8 ml of hydrazine monohydrate were added, and then the mixture was stirred at room temperature for 1 hour. Next, the mixture was stirred at 70° C. for 1 hour to react. After the reaction was complete, the reaction mixture was filtered with celite, and 300 ml of ethyl acetate was added to the obtained filtrate. Then, after the obtained organic layer was washed with water 3 times by using a separatory funnel, the organic layer was concentrated and dried. The dried product was recrystallized in ethanol to obtain 7 g of a compound (b-1-3).

Preparation Example 4

The compound represented by formula (b-1-4) (referred to as "compound (b-1-4)" hereinafter, same as formula (I-17)) was synthesized according to the following synthesis scheme 4.

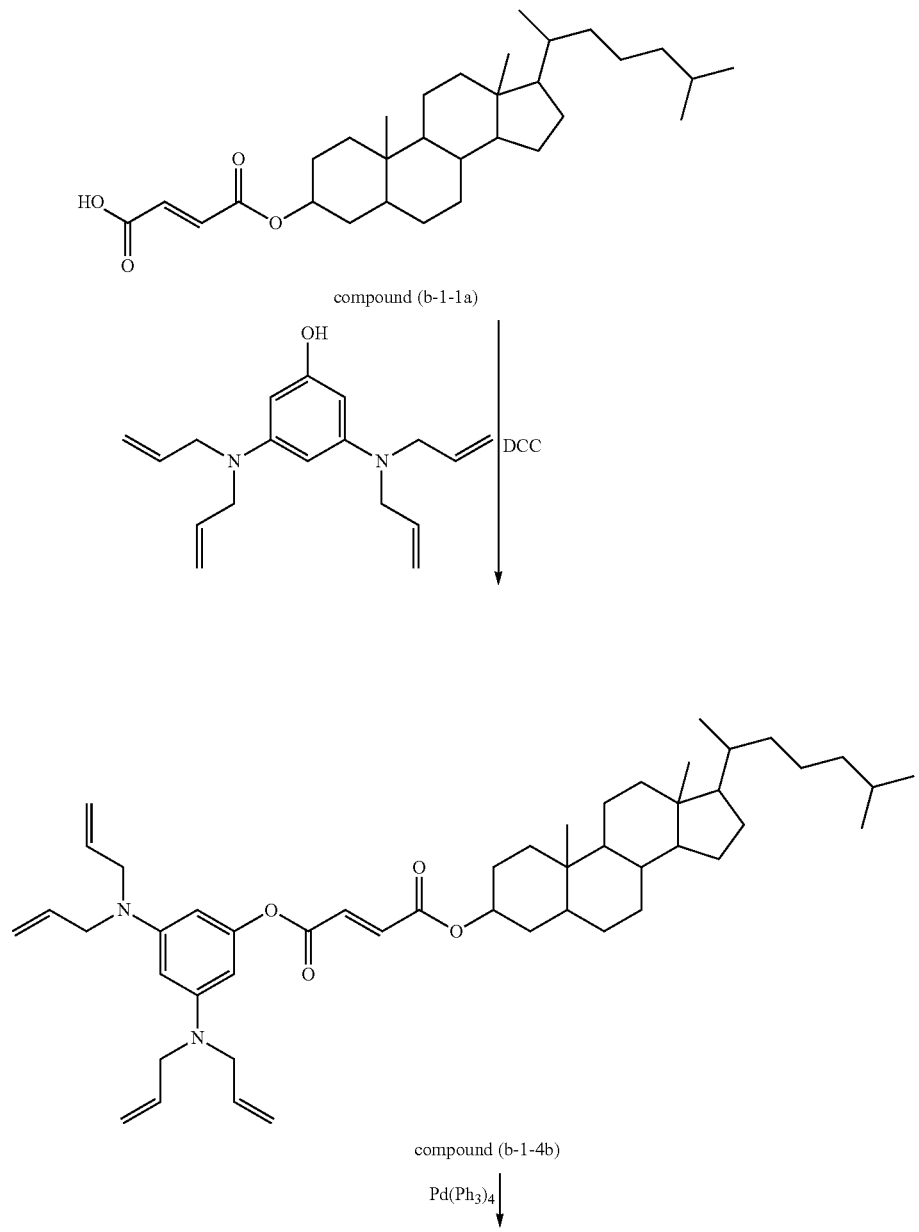

-continued

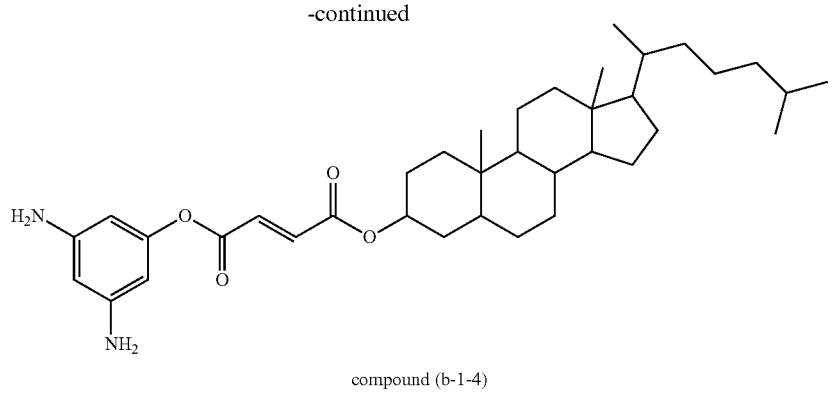

compound (b-1-4)

(1) Synthesis of Compound (b-1-4b)

47 g of the compound (b-1-1a) and 28 g of 3,5-(N,N-diallyl)diaminophenol were mixed and then stirred in 400 ml of tetrahydrofuran at 0° C. After 25 g of N,N'-dicyclohexylcarbodiimide (DCC) and 2.4 g of N,N-dimethylaminopyridine were added to the mixture, the mixture was stirred at 25° C. for 4 hours. Then, chloroform was added, and the organic layer was washed with water and then concentrated. The concentrate was refined by column chromatography (elution solvent: hexane:ethyl acetate=8:1 (volume ratio)) to obtain a crude product of a compound (b-1-4b).

(2) Synthesis of Compound (b-1-4)

38 g of the obtained compound (b-1-4b), 23 g of 1,3-dimethyl barbituric acid, and 1.1 g of tetrakis(triphenylphosphine)palladium(0) (Pd(Ph$_3$)$_4$) were mixed and then stirred in 200 ml of dichloromethane at 35° C. for 7 hours to react. After the reaction was complete, the reaction mixture was successively washed with an aqueous solution of saturated sodium bicarbonate and water, and the organic layer was concentrated. Then, the solvent was removed to obtain a brown viscous fluid. After the viscous fluid was refined by column chromatography (elution solvent: chloroform:ethanol=95:5 (volume ratio)), recrystallization was performed in ethanol to obtain 13 g of light yellow powder of a compound (b-1-4).

Synthesis Examples

In the following, synthesis example A-1-1 to synthesis example A-1-10 of the polymer composition (A-1) are described:

Synthesis Example A-1-1

A nitrogen inlet, a stirrer, a condenser, and a thermometer were provided in a 500 ml four-neck flask, and then nitrogen gas was introduced. Then, 0.005 moles (10% mole) of the compound (b-1-1), 0.015 moles (30% mole) of the compound (b-2-1), 0.03 moles (60% mole) of the compound (b-2-1), and 80 g of N-methyl-2-pyrrolidone (hereinafter NMP) were added, and the mixture was stirred at room temperature until dissolved. Next, 0.05 moles (100% mole) of 2,3,5-tricarboxycyclopentylacetic acid dianhydride (a-1) and 20 g of NMP were added, and the mixture was reacted at room temperature for 2 hours. After the reaction was complete, the reaction solution was poured into 1500 ml of water to precipitate a polymer. Then, the obtained polymer was filtered and the steps of washing and filtration were performed repeatedly three times with methanol. Next, the product was placed in a vacuum oven, and the product was dried at a temperature of 60° C. to obtain a polymer composition (A-1-1).

Synthesis Example A-1-2 to Synthesis Example A-1-10

The polymer composition of each of synthesis example A-1-2 to synthesis example A-1-10 was prepared with the same steps as synthesis example A-1-1, and the difference thereof is: the type and the usage amount of each of the raw materials of the polymer compositions were changed (as shown in Table 1), wherein the compounds corresponding to the labels of Table 1 are as shown below.

| Abbreviation | Component |
| --- | --- |
| a-1 | 2,3,5-tricarboxycyclopentylacetic acid dianhydride |
| a-2 | 1,2,3,4-cyclobutane tetracarboxylic acid dianhydride |
| a-3 | pyrometallitic dianhydride |

| Abbreviation | Component |
|---|---|
| b-1-1 | 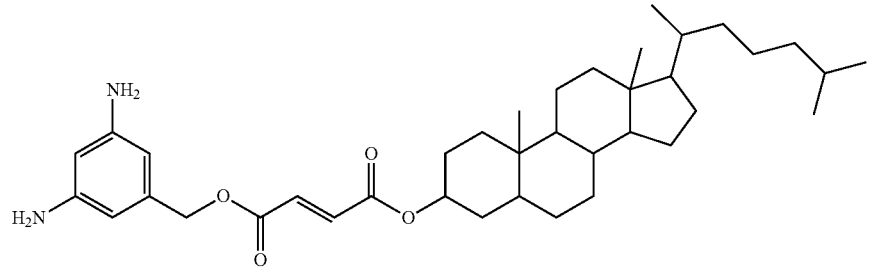<br>formula (I-10) |
| b-1-2 | 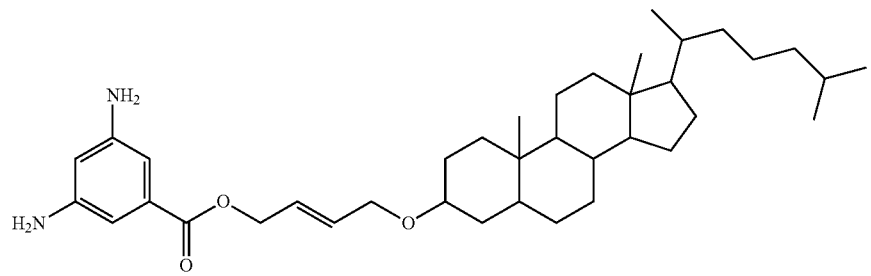<br>formula (I-11) |
| b-1-3 | 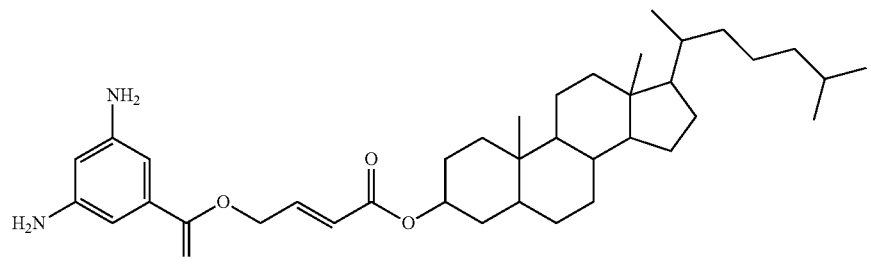<br>formula (I-19) |
| b-1-4 | 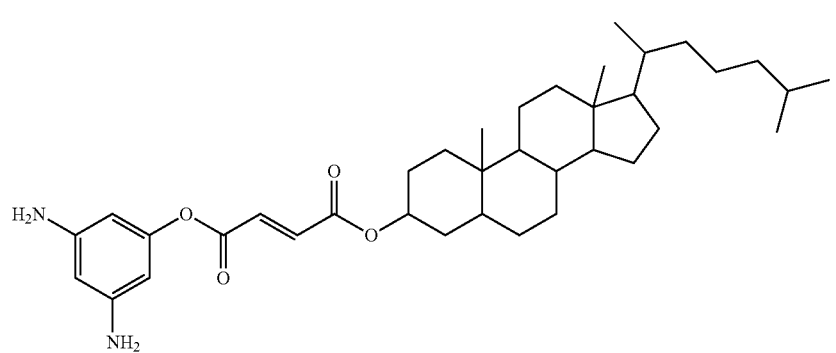<br>formula (I-17) |

| Abbreviation | Component |
|---|---|
| b-2-1 | 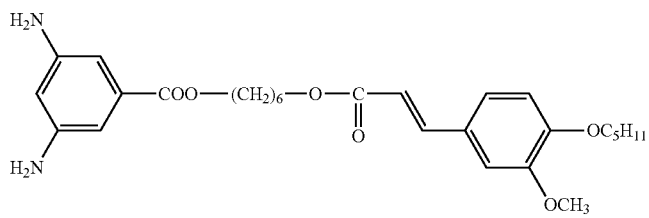
formula (II-1-3) |
| b-2-2 | 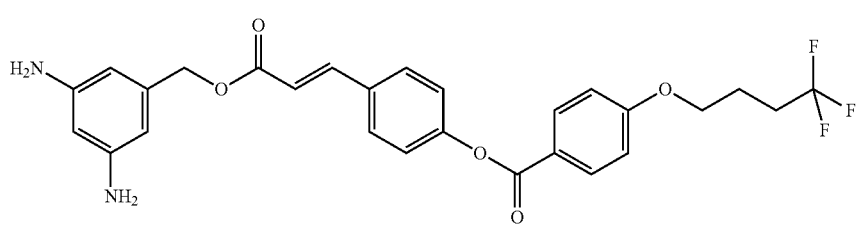
formula (II-1-6) |
| b-2-3 | 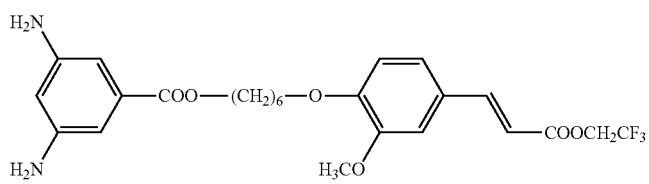
formula (II-2-1) |
| b-2-4 | 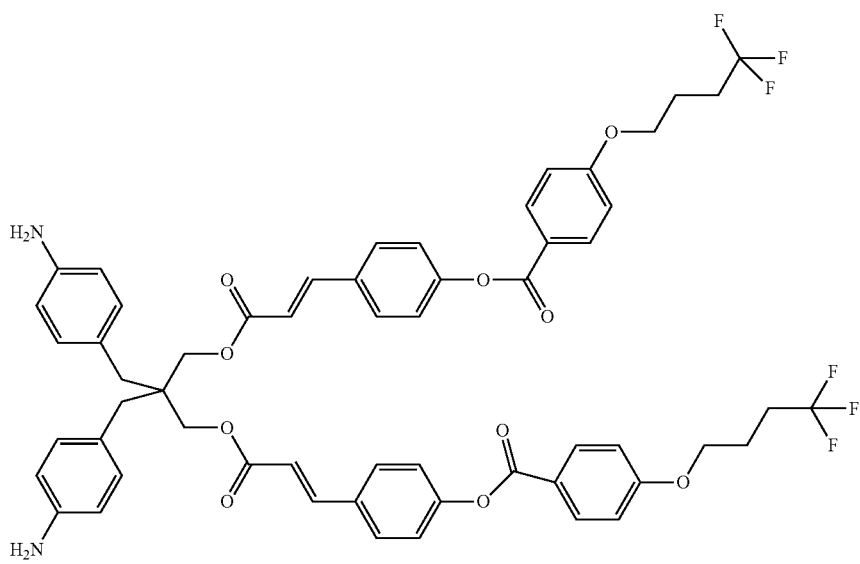
formula (II-1-7) |
| b-3-1 | p-diaminobenzene |
| b-3-2 | 2,2'-dimethyl-4,4'-diamino biphenyl |
| b-3-3 | 4,4'-methylenebis(cyclohexylamine) |
| b-3-4 | 1,4-diaminocyclohexane |

| Abbreviation | Component |
|---|---|
| b-3-5 | 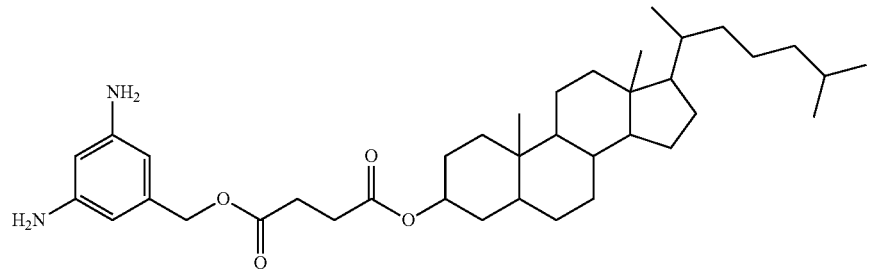 [SMILES: CC(C)CCCC(C)C1CCC2C3CCC4CC(OC(=O)CCC(=O)OCc5cc(N)cc(N)c5)CCC4(C)C3CCC12C] |
| b-3-6 | 3,3'-diaminochalcone |
| b-3-7 | 4,4'-diaminostilbene |

TABLE 1

| Component (unit: mole %) | | Synthesis example | | | | |
|---|---|---|---|---|---|---|
| | | A-1-1 | A-1-2 | A-1-3 | A-1-4 | A-1-5 |
| Tetracarboxylic acid dianhydride compound (a) | a-1 | 100 | — | — | 50 | — |
| | a-2 | — | 100 | — | 50 | — |
| | a-3 | — | — | 100 | — | 100 |
| Diamine compound (b) | Diamine (b-1) b-1-1 | 10 | — | — | 25 | — |
| | b-1-2 | — | — | 30 | — | — |
| | b-1-3 | — | 20 | — | — | 40 |
| | b-1-4 | — | — | — | 25 | — |
| | Diamine (b-2) b-2-1 | 30 | — | — | — | 20 |
| | b-2-2 | — | — | 10 | — | — |
| | b-2-3 | — | — | — | 40 | 30 |
| | b-2-4 | — | 20 | — | — | — |
| | Diamine (b-3) b-3-1 | 60 | — | — | 10 | — |
| | b-3-2 | — | 30 | — | — | — |
| | b-3-3 | — | 30 | — | — | 10 |
| | b-3-4 | — | — | 60 | — | — |
| | b-3-5 | — | — | — | — | — |
| | b-3-6 | — | — | — | — | — |
| | b-3-7 | — | — | — | — | — |
| (b-1)/(b-2) molar ratio | | 0.33 | 1.00 | 3.00 | 1.25 | 0.80 |

| Component (unit: mole %) | | Synthesis example | | | | |
|---|---|---|---|---|---|---|
| | | A-1-6 | A-1-7 | A-1-8 | A-1-9 | A-1-10 |
| Tetracarboxylic acid dianhydride compound (a) | a-1 | 100 | — | — | — | 100 |
| | a-2 | — | 100 | — | 100 | — |
| | a-3 | — | — | 100 | — | — |
| Diamine compound (b) | Diamine (b-1) b-1-1 | — | — | — | — | — |
| | b-1-2 | 20 | — | 0.5 | — | 50 |
| | b-1-3 | — | 5 | — | 1.5 | — |
| | b-1-4 | — | — | — | — | — |
| | Diamine (b-2) b-2-1 | — | — | — | 30 | — |
| | b-2-2 | 80 | — | 60 | — | — |
| | b-2-3 | — | 70 | — | — | 50 |
| | b-2-4 | — | — | — | — | — |
| | Diamine (b-3) b-3-1 | — | — | — | 68.5 | — |
| | b-3-2 | — | 25 | — | — | — |
| | b-3-3 | — | — | 39.5 | — | — |
| | b-3-4 | — | — | — | — | — |
| | b-3-5 | — | — | — | — | — |
| | b-3-6 | — | — | — | — | — |
| | b-3-7 | — | — | — | — | — |
| (b-1)/(b-2) molar ratio | | 0.25 | 0.07 | 0.01 | 0.05 | 1.00 |

Comparative Synthesis Example A-2-1 to Comparative Synthesis Example A-2-6

The polymer composition of each of comparative synthesis example A-2-1 to comparative synthesis example A-2-6 was prepared with the same steps as synthesis example A-1-1, and the difference thereof is: the type and the usage amount of each of the raw materials of the polymer compositions were changed (as shown in Table 2).

TABLE 2

| Component (unit: mole %) | | | Comparative synthesis example | | | | | |
|---|---|---|---|---|---|---|---|---|
| | | | A-2-1 | A-2-2 | A-2-3 | A-2-4 | A-2-5 | A-2-6 |
| Tetracarboxylic acid dianhydride compound (a) | | a-1 | 100 | — | — | — | 100 | — |
| | | a-2 | — | 100 | — | 100 | — | 100 |
| | | a-3 | — | — | 100 | — | — | — |
| Diamine compound (b) | Diamine (b-1) | b-1-1 | — | — | — | — | — | — |
| | | b-1-2 | — | — | — | — | 30 | — |
| | | b-1-3 | — | — | — | — | — | — |
| | | b-1-4 | — | — | — | — | — | — |
| | Diamine (b-2) | b-2-1 | — | — | — | — | — | — |
| | | b-2-2 | — | — | — | — | — | 50 |
| | | b-2-3 | — | — | — | 40 | — | — |
| | | b-2-4 | — | — | — | — | — | — |
| | Diamine (b-3) | b-3-1 | 60 | — | — | — | — | 50 |
| | | b-3-2 | — | — | — | — | — | — |
| | | b-3-3 | — | 70 | — | — | — | — |
| | | b-3-4 | — | — | — | — | 70 | — |
| | | b-3-5 | — | — | 50 | 60 | — | — |
| | | b-3-6 | — | 30 | — | — | — | — |
| | | b-3-7 | 40 | — | 50 | — | — | — |
| (b-1)/(b-2) molar ratio | | | — | — | — | — | — | 0 |

Examples of Liquid Crystal Alignment Agent

Example 1 to example 15 and comparative example 1 to comparative example 6 of the liquid crystal alignment agent are described below:

Example 1

100 parts by weight of the polymer composition (A-1-1) was added to 1200 parts by weight of NMP (hereinafter B-1) and 600 parts by weight of ethylene glycol n-butyl ether (hereinafter B-2). Then, the mixture was continuously stirred at room temperature with a stirring apparatus until dissolved to obtain the liquid crystal alignment agent of example 1. The obtained liquid crystal alignment agent was evaluated by the following evaluation methods, and the results are as shown in Table 3. In particular, the method of determining the uniformity of pretilt angle after ultraviolet irradiation is described below.

Example 2 to Example 15

The liquid crystal alignment agent of each of example 2 to example 15 was prepared using the same steps as example 1, and the difference thereof is: the type and the usage amount of each of the components of the liquid crystal alignment agents were changed (as shown in Table 3), wherein the compounds corresponding to the labels of Table 3 are as shown below. Each of the obtained liquid crystal alignment agent was evaluated by each of the following evaluation methods, and the results are as shown in Table 3.

| Abbreviation | Component |
|---|---|
| B-1 | N-methyl-2-pyrrolidone (NMP) |
| B-2 | Ethylene glycol n-butyl ether |
| B-3 | N,N-dimethyl acetamide |
| C-1 | N,N,N',N'-tetraglycidyl-4,4'-diamino diphenyl methane |
| C-2 | N,N-glycidyl-p-glycidyloxy aniline |

Comparative Example 1 to Comparative Example 6

The liquid crystal alignment agent of each of comparative example 1 to comparative example 6 was prepared using the same steps as example 1, and the difference thereof is: the type and the usage amount of each of the components of the liquid crystal alignment agents were changed (as shown in Table 4). Each of the obtained liquid crystal alignment agent was evaluated by each of the following evaluation methods, and the results are as shown in Table 4.

<Evaluation Methods>
Uniformity of Pretilt Angle after Ultraviolet Irradiation

The liquid crystal alignment agents above were made into liquid crystal alignment films on a 30 mm×40 mm rectangular glass substrate, and liquid crystal display devices having the liquid crystal alignment films were made. Then, the liquid crystal display devices were irradiated with ultraviolet (UV light).

Next, nine fixed points were selected on each of the rectangular glass substrates, and pretilt angles P of the liquid crystal display devices were respectively measured. Then, the rate of change of the pretilt angles P was calculated with formula (7) below, and evaluation was carried out according to the following criteria. The greater the rate of change of P, the worse the uniformity of pretilt angle of the liquid crystal display devices after ultraviolet irradiation.

$$\text{rate of change of } P = (P_{max\ value} - P_{min\ value}) \times 100\% \quad \text{formula (7)}$$

⊚: rate of change of P≤3%.
○: 3%<rate of change of P≤5%.
Δ: 5%<rate of change of P≤10%.
X: 10%<rate of change of P.

TABLE 3

| Component (unit: parts by weight) | | | Example | | | | | | | |
|---|---|---|---|---|---|---|---|---|---|---|
| | | | 1 | 2 | 3 | 4 | 5 | 6 | 7 | 8 |
| Polymer composition (A) | Polymer composition (A-1) | A-1-1 | 100 | — | — | — | — | — | — | — |
| | | A-1-2 | — | 100 | — | — | — | — | — | — |
| | | A-1-3 | — | — | 100 | — | — | — | — | — |
| | | A-1-4 | — | — | — | 100 | — | — | — | — |
| | | A-1-5 | — | — | — | — | 100 | — | — | — |
| | | A-1-6 | — | — | — | — | — | 100 | — | — |
| | | A-1-7 | — | — | — | — | — | — | 100 | — |
| | | A-1-8 | — | — | — | — | — | — | — | 100 |
| | | A-1-9 | — | — | — | — | — | — | — | — |
| | | A-1-10 | — | — | — | — | — | — | — | — |

TABLE 3-continued

| | | | | | | | | | | |
|---|---|---|---|---|---|---|---|---|---|---|
| Polymer composition (A-2) | | A-2-1 | — | — | — | — | — | — | — | — |
| | | A-2-2 | — | — | — | — | — | — | — | — |
| | | A-2-3 | — | — | — | — | — | — | — | — |
| | | A-2-4 | — | — | — | — | — | — | — | — |
| | | A-2-5 | — | — | — | — | — | — | — | — |
| | | A-2-6 | — | — | — | — | — | — | — | — |
| Solvent (B) | | B-1 | 1200 | — | 800 | — | — | 1000 | 900 | 850 |
| | | B-2 | 600 | 1600 | — | 800 | 1500 | — | 300 | 850 |
| | | B-3 | — | — | 1000 | 800 | 100 | 600 | 300 | — |
| Additive (C) | | C-1 | — | — | — | — | — | — | — | 5 |
| | | C-2 | — | — | 10 | — | — | — | — | — |
| Uniformity of pretilt angle after ultraviolet irradiation | | | ◎ | ◎ | ○ | ◎ | ◎ | ◎ | ◎ | ○ |

| Component (unit: parts by weight) | | | Example | | | | | | |
|---|---|---|---|---|---|---|---|---|---|
| | | | 9 | 10 | 11 | 12 | 13 | 14 | 15 |
| Polymer composition (A) | Polymer composition (A-1) | A-1-1 | — | — | — | — | — | — | 30 |
| | | A-1-2 | — | — | — | — | — | — | — |
| | | A-1-3 | — | — | — | — | 50 | — | — |
| | | A-1-4 | — | — | — | — | — | — | — |
| | | A-1-5 | — | — | — | — | — | 20 | — |
| | | A-1-6 | — | — | 40 | — | — | — | — |
| | | A-1-7 | — | — | — | 30 | — | — | — |
| | | A-1-8 | — | — | — | — | — | — | 70 |
| | | A-1-9 | 100 | — | — | — | — | — | — |
| | | A-1-10 | — | 100 | — | — | — | 80 | — |
| | Polymer composition (A-2) | A-2-1 | — | — | 60 | — | — | — | — |
| | | A-2-2 | — | — | — | — | 50 | — | — |
| | | A-2-3 | — | — | — | 70 | — | — | — |
| | | A-2-4 | — | — | — | — | — | — | — |
| | | A-2-5 | — | — | — | — | — | — | — |
| | | A-2-6 | — | — | — | — | — | — | — |
| Solvent (B) | | B-1 | 1400 | — | — | 800 | 400 | — | 1200 |
| | | B-2 | — | 1000 | — | 750 | 400 | 1200 | 600 |
| | | B-3 | — | 350 | 1500 | — | 400 | 250 | — |
| Additive (C) | | C-1 | — | — | — | 3 | — | — | — |
| | | C-2 | — | — | — | 3 | — | — | — |
| Uniformity of pretilt angle after ultraviolet irradiation | | | ◎ | ◎ | ◎ | ◎ | ○ | ◎ | ○ |

TABLE 4

| Component (unit: parts by weight) | | | Comparative example | | | | | |
|---|---|---|---|---|---|---|---|---|
| | | | 1 | 2 | 3 | 4 | 5 | 6 |
| Polymer composition (A) | Polymer composition (A-1) | A-1-1 | — | — | — | — | — | — |
| | | A-1-2 | — | — | — | — | — | — |
| | | A-1-3 | — | — | — | — | — | — |
| | | A-1-4 | — | — | — | — | — | — |
| | | A-1-5 | — | — | — | — | — | — |
| | | A-1-6 | — | — | — | — | — | — |
| | | A-1-7 | — | — | — | — | — | — |
| | | A-1-8 | — | — | — | — | — | — |
| | | A-1-9 | — | — | — | — | — | — |
| | | A-1-10 | — | — | — | — | — | — |
| | Polymer composition (A-2) | A-2-1 | 100 | — | — | — | — | — |
| | | A-2-2 | — | 100 | — | — | — | — |
| | | A-2-3 | — | — | 100 | — | — | — |
| | | A-2-4 | — | — | — | 100 | — | — |
| | | A-2-5 | — | — | — | — | 100 | — |
| | | A-2-6 | — | — | — | — | — | 100 |
| Solvent (B) | | B-1 | 1200 | — | 800 | 1000 | — | — |
| | | B-2 | 600 | 1600 | — | 1600 | 800 | — |
| | | B-3 | — | — | 1000 | — | 800 | 1500 |
| Additive (C) | | C-1 | — | — | — | — | — | 100 |
| | | C-2 | — | — | — | — | — | — |
| Uniformity of pretilt angle after ultraviolet irradiation | | | X | X | X | X | X | X |

<Evaluation Results>

It can be known from Table 3 and Table 4 that, in comparison to the liquid crystal alignment agents only containing the polymer composition (A-2) (comparative example 1 to comparative example 6), the uniformity of pretilt angle of the liquid crystal display devices made by the liquid crystal alignment agents containing the polymer composition (A-1) (example 1 to example 15) after ultraviolet irradiation is better. More specifically, referring to both Table 1 and Table 2, the polymer composition (A-1) formed by the diamine (b-1) and the diamine (b-2) at the same time is used to form a liquid crystal alignment film, and the liquid crystal alignment film is applied in a liquid crystal display device. The uniformity of pretilt angle of the liquid crystal display device after ultraviolet irradiation is better.

Moreover, when the molar ratio (b-1)/(b-2) of the diamine (b-1) and the diamine (b-2) of the polymer composition (A-1) is 0.05 to 1.5 (i.e., when the polymer composition (A-1-1), the polymer composition (A-1-2), the polymer composition (A-1-4) to the polymer composition (A-1-7), the polymer composition (A-1-9), and the polymer composition (A-1-10) are used), the uniformity of pretilt angle of the liquid crystal display devices (examples 1, 2, 4, 5, 6, 7, 9, 10, 11, 12, and 14) using the liquid crystal alignment films made by the liquid crystal alignment agents after ultraviolet irradiation is better.

Based on the above, since the liquid crystal alignment agent of the invention contains a specific diamine, when the liquid crystal alignment agent is applied in a liquid crystal alignment film, the liquid crystal display device has the characteristic of good uniformity of pretilt angle after ultraviolet irradiation. As a result, the liquid crystal alignment agent is suitable for a liquid crystal alignment film and a liquid crystal display device.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A liquid crystal alignment agent, comprising:
   a polymer composition (A-1); and
   a solvent (B),
   wherein the polymer composition (A-1) is obtained by reacting a tetracarboxylic acid dianhydride compound (a) with a diamine compound (b),
   the diamine compound (b) comprises at least one type of a diamine (b-1) represented by formula (I) and at least one type of a diamine (b-2) having a structure represented by formula (II), wherein a molar ratio (b-1)/(b-2) of the diamine (b-1) represented by formula (I) and the diamine (b-2) having the structure represented by formula (II) is 0.05 to 1.5,

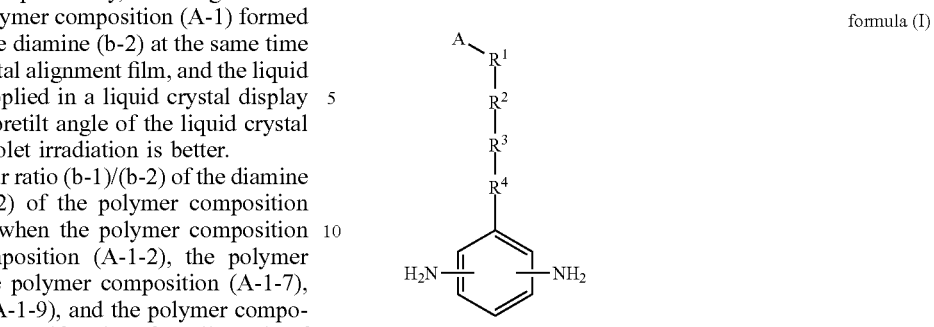

formula (I)

in formula (I), $R^1$ and $R^3$ each independently represent an ether group, a thioether group, an ester group, or a thioester group;

$R^2$ represents an alkylene group containing an unsaturated bond;

$R^4$ represents a single bond, a methylene group, or an ethylene group;

A represents a $C_{17}$ to $C_{40}$ monovalent organic group having a steroid frame,

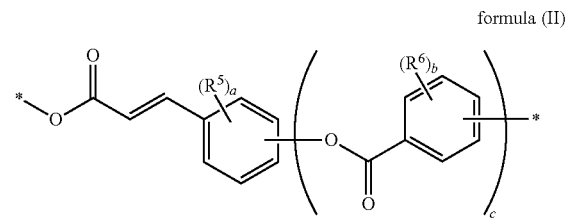

formula (II)

in formula (II), $R^5$ and $R^6$ each independently represent a $C_1$ to $C_6$ alkyl group, a $C_1$ to $C_6$ alkoxy group, a halogen atom, or a cyano group;

a and b each independently represent an integer of 0 to 4;

c represents 0 or 1;

* each independently represents a bonding position.

2. The liquid crystal alignment agent of claim 1, wherein the diamine (b-2) having the structure represented by formula (II) comprises a structure represented by formula (II-1), a structure represented by formula (II-2), or a combination of the two,

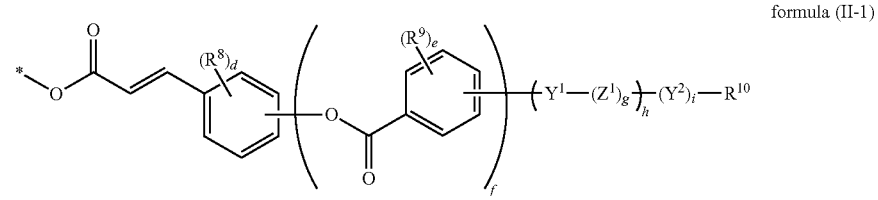

formula (II-1)

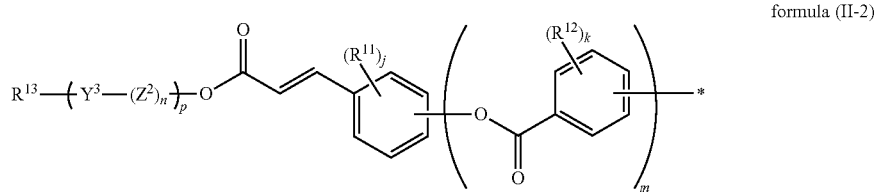

formula (II-2)

in formula (II-1) and formula (II-2), $R^8$, $R^9$, $R^{11}$, and $R^{12}$ each independently represent a $C_1$ to $C_6$ alkyl group, a $C_1$ to $C_6$ alkoxy group, a halogen atom, or a cyano group;

$R^{10}$ and $R^{13}$ each independently represent a $C_1$ to $C_{40}$ alkyl group or a $C_1$ to $C_{40}$ alkyl group substituted by a fluorine atom;

$Y^1$, $Y^2$, and $Y^3$ each independently represent

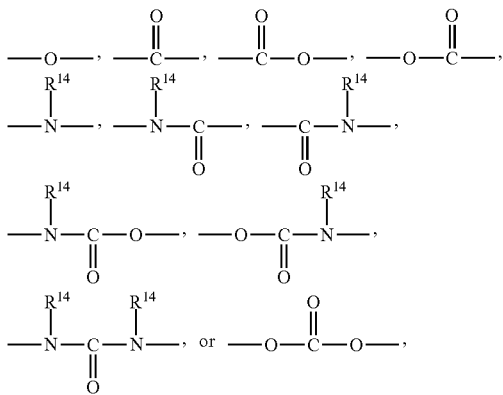

wherein $R^{14}$ represents a hydrogen atom or a $C_1$ to $C_4$ alkyl group;

$Z^1$ and $Z^2$ each independently represent a methylene group, an arylene group, a divalent alicyclic group, —Si(CH$_3$)$_2$—, —CH=CH—, —C≡C—, a methylene group having a substituent, an arylene group having a substituent, a divalent alicyclic group having a substituent, —Si(CH$_3$)$_2$-having a substituent, or —CH=CH— having a substituent, wherein the substituent is a cyano group, a halogen atom, or a $C_1$ to $C_4$ alkyl group;

d, e, j, and k each independently represent an integer of 0 to 4;

f and m represent 0 or 1;

g and n each independently represent an integer of 1 to 6;

h and p each independently represent an integer of 0 to 2;

i represents an integer of 0 or 1;

* each independently represents a bonding position.

3. The liquid crystal alignment agent of claim 1, wherein based on a total number of moles of 100 moles of the diamine compound (b), a usage amount of the diamine (b-1) represented by formula (I) is 0.5 to 50 moles, and a usage amount of the diamine (b-2) having the structure represented by formula (II) is 10 to 80 moles.

4. The liquid crystal alignment agent of claim 1, wherein a molar ratio (b-1)/(b-2) of the diamine (b-1) represented by formula (I) and the diamine (b-2) having the structure represented by formula (II) is 0.1 to 1.3.

5. The liquid crystal alignment agent of claim 4, wherein a molar ratio (b-1)/(b-2) of the diamine (b-1) represented by formula (I) and the diamine (b-2) having the structure represented by formula (II) is 0.2 to 1.0.

6. A liquid crystal alignment film formed by the liquid crystal alignment agent of claim 1.

7. A liquid crystal display device, comprising the liquid crystal alignment film of claim 6.

* * * * *